(12) United States Patent
Miyahara et al.

(10) Patent No.: US 6,404,926 B1
(45) Date of Patent: Jun. 11, 2002

(54) APPARATUS AND METHOD OF PROCESSING IMAGE DATA, TRANSMISSION MEDIUM, AND RECORDING MEDIUM

(75) Inventors: Nobuyoshi Miyahara, Kanagawa; Yoichi Yagasaki, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/145,085

(22) Filed: Sep. 1, 1998

(30) Foreign Application Priority Data

Sep. 2, 1997 (JP) .............................................. 9-252822

(51) Int. Cl.⁷ ................................................. G06K 9/46
(52) U.S. Cl. ......................... 382/232; 382/100; 380/54; 380/201; 705/57; 713/176
(58) Field of Search ................................. 382/100, 232; 380/210, 287, 54, 229, 28, 239, 200, 201; 713/150, 176, 179; 348/461, 463; 709/217, 219, 228, 229, 230, 250; 705/57, 64, 58, 51

(56) References Cited

U.S. PATENT DOCUMENTS 5,859,920 A * 1/1999 Daye et al. ................. 382/115
5,875,249 A * 2/1999 Mintzer et al. ............... 380/54
5,881,287 A * 3/1999 Mast ........................... 395/701
5,915,027 A * 6/1999 Cox et al. ...................... 380/54
6,026,193 A * 2/2000 Rhoads ........................ 382/232
6,031,914 A * 2/2000 Tewfik et al. .................. 380/54
6,182,218 B1 * 1/2001 Saito ........................... 713/176

* cited by examiner

Primary Examiner—Leo Boudreau
Assistant Examiner—Yosef Kassa
(74) Attorney, Agent, or Firm—Frommer Lawrence & Haug LLP; William S. Frommer; Bruno Polito

(57) ABSTRACT

The present invention relates to an apparatus and a method of processing an image data, a transmission medium, as well as a recording medium. In detail, in an image data processing of processing an image data in which an accompany information is embedded as a watermark, having a memory which stores the patterns of the watermark, setting a phase of a pattern of the watermark being stored in the memory, to a first phase or a second phase, calculating a first evaluation value corresponding to a pattern of the watermark of the first phase, of the image data inputted, and a second evaluation value corresponding to a pattern of the watermark of the second phase, and comparing the first evaluation value, and a value corresponding to the second evaluation value. As a result, it makes possible to read the accompany information more securely.

12 Claims, 21 Drawing Sheets

| SHIFT PHASE r | ACCOMPANY INFORMATION SIGNAL g | MEANING |
|---|---|---|
| r1 | 00 | ADDING A COPY |
| r2 | 01 | ONE TIME COPY AVILABLE |
| r3 | 10 | TWO-TIME COPY AVILABLE |
| r4 | 11 | THREE-TIME COPY AVILABLE |

AUXLIARY PART

MAIN PART

A PICTURE OF PERSONAL COMPUTER IN DOTTED LINE IS EMBEDDED.

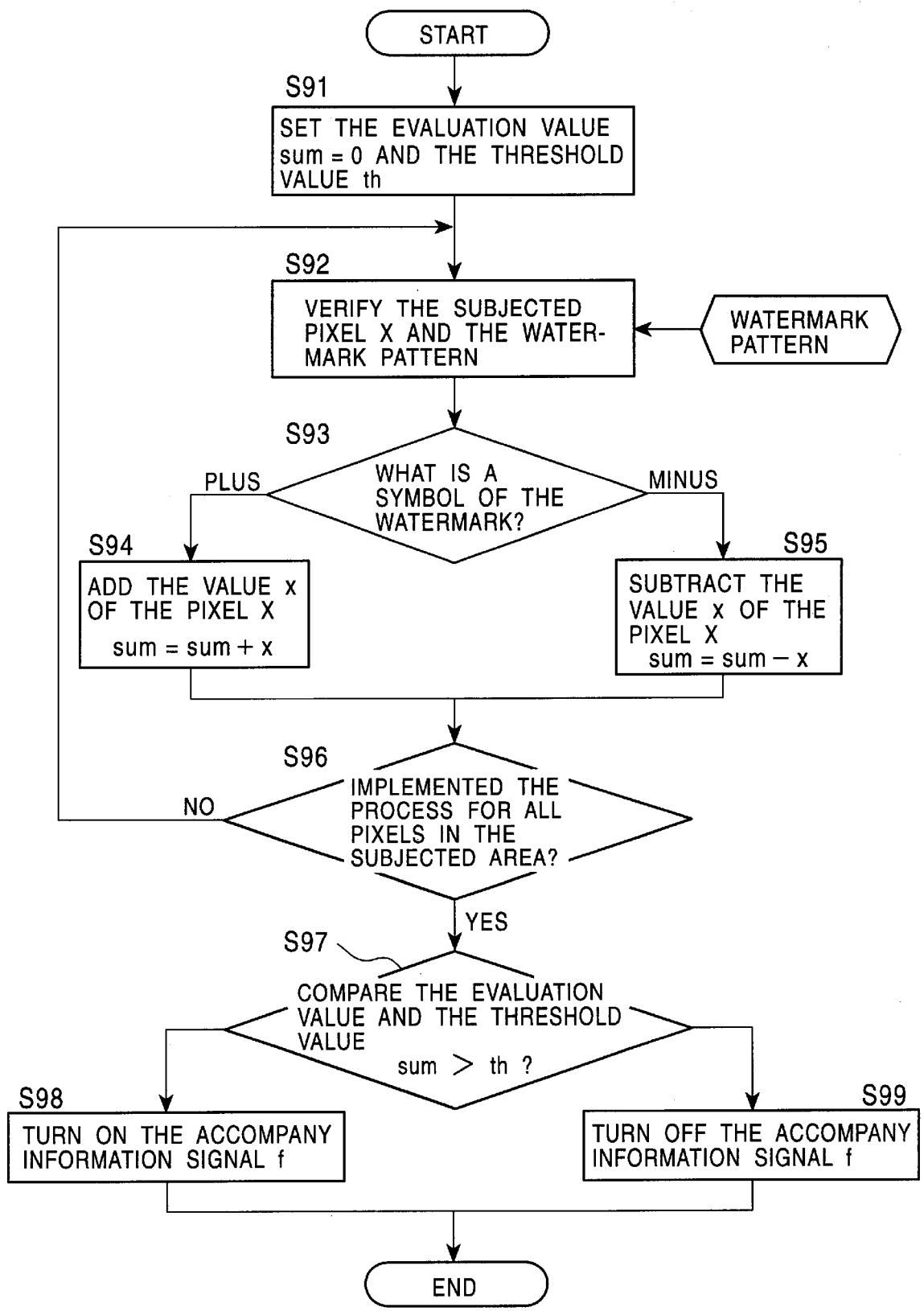

APPARATUS AND METHOD OF PROCESSING IMAGE DATA, TRANSMISSION MEDIUM, AND RECORDING MEDIUM

BACKGROUND OF THE INVENTION

1. Field of the Invention

The present invention relates to an apparatus and a method of processing an image data, a transmission medium and a recording medium. In particular, the present invention relates to an apparatus and a method of processing an image data, a transmission medium and a recording medium, capable of reading an accompany information much accurately.

2. Description of the Related Art

There is a technology, for a specific image data (a still image or a motion image sequence), which adds an information accompanied therewith into an image data, detects and utilizes the accompany information at a time when reproducing. As a representative example thereof, an addition of a copyright information is given.

When an unspecified (a general) user can utilize a specific image data, it is necessary to add a copyright information into the image data in advance in order that a person having a copyright for the image asserts the right thereof. By adding the copyright information, it makes possible to take steps of not displaying the image data when the copyright information indicating the image data to be not displayed is detected in the reproducing apparatus of the image or during the procedures in the reproducing method.

The above-mentioned addition or detection of the copyright information is, at a present time, well utilized for preventing an unauthorized duplication of videotape and the like. Recently, there exist many video tape rental shops, but if many users had enjoyed the video tapes by making the unauthorized duplications of the video tapes that they have rented by a low fare from the rental shops, the damages of the persons having the copyright of the video tapes and the video rental shops would be very bad.

Since an image data is recorded analogously in videotape, an image quality will be a little degraded when duplicating. As a result, when the duplications have been made several times, it becomes very difficult to maintain the image quality that has been held originally.

In contrast, in the devices that record and reproduce the image data digitally, the damage caused by the unauthorized duplication could be much worse. That is, in the devices that dealt with the image data digitally, there is no degradation of the image quality by duplication, in principle. As a result, the prevention of the unauthorized duplication in the devices that process digitally is far important than the one in analogue.

There are two methods of adding the information accompanied with the image data into that image data.

A first method is a method of adding into an auxiliary part of the image data. For example, in the videotape, as shown in FIG. 18, an auxiliary information of that image data is recorded in an upper part of the screen (the auxiliary part) which is substantially not displayed on the display screen. It is possible to add an accompany information, by utilizing a part of this area.

A second method is a method of adding into a-main part (a part to be substantially displayed) of the image data. This is, as shown in FIG. 19, the one that adds a specific pattern (WaterMark) to a part of or an entire image, with a degree of not visually sensible. As a concrete example thereof, there are a spectrum diffusion and the like that implement an addition or a detection of the information, by utilizing a key pattern which is generated using random numbers or M-series and the like.

In the following, an example of an addition or a detection an accompany information to the main part of the image data when using a watermark pattern. The concrete examples are shown in FIGS. 20–23.

Assuming to use the watermark pattern corresponding to the pixels of 4n×4n, as shown in FIG. 20. The watermark pattern takes either a plus or a minus of 2 symbols for each pixel.

The watermark pattern preferably takes either one of 2 symbols at random, and a shape and a size of that area are optional.

When adding the watermark, an area whose size is equal to the size of the area of the watermark is set on the image subjected to implement the addition. By checking the area being set against the watermark pattern in superimposition, the value a is added to a pixel to which a plus symbol corresponds, and the value b is subtracted from a pixel to which a minus symbol corresponds. The values a, b might be arbitrary values, but they should be kept as constants throughout the watermark pattern thereof.

In the examples of FIGS. 21–23, a=1, b=1 are set, and as shown in FIG. 21, when all pixel values in the area subjected to implement the addition are 100, the pixel values of 101 and 99 are formed by an embedding operation which corresponds to the watermark.

When detecting the watermark, an area whose size is equal to the size of the area of the watermark is set on the image subjected to implement detection. A value of which all of the pixel values of this area are summed up is used as an evaluation value. When summing all of the pixel values, an addition is applied for a pixel to which a plus symbol corresponds, and a subtraction is applied for a pixel to which a minus symbol corresponds, by checking the area being set against the watermark pattern in superimposition. In the example of FIG. 22, a pixel of the pixel value 101 is added, and a pixel of the pixel value 99 is subtracted, and the calculated results thereof are added. At this moment, the watermark can not be detected correctly unless using the pattern that is the same as the watermark pattern used for adding the watermark. According to the detection operation described above, for example as shown in FIG. 22, the evaluation value at a time when the watermark is added turns to be $(4n)^2$ (the same as the numbers of pixels included in the area), and as shown in FIG. 23, the evaluation value at a time when no watermark is added turns to zero (0).

When the area of the watermark pattern is a quite large, and the watermark pattern is sufficiently at random, the evaluation value at a time when no watermark is added turns to be almost zero all the time. As a result, when the evaluation value exceeds a certain threshold, it might be evaluated as the watermark being added. According to the procedures described above, it makes possible to add a binary information (1 bit) of whether or not the watermark is added. When it is desirable to add more information, the information of the $2^k$ ways (k bits) can be added by dividing the whole image into the k-areas and according to a method of processing such as respectively implementing the above mentioned operations.

As a watermark pattern, the one that is generated by using, for example, the M-series can be utilized. The M-series (the longest code series) is a sequence of numbers consisting of the binary symbols of 0 and 1, and the statistical distributions of the 0 and 1 are constant, and the code correlation is 1 at the origin, and is inversely proportional to the code length at other points. Of course, a watermark might be generated by a method other than the M-series.

When recording and reproducing. the image data digitally, it is a common practice to compress the data because an amount of information thereof becomes quite large if being kept as it is. As a method of compressing the image data, the low bit rate coding methods, such as the JPEG (Joint Photographic Experts Group) (color still image coding method), or the MPEG (Moving Picture Experts Group) (color motion image coding method) and the like are internationally standardized and turned to be in practical use. In the following, as an example, considering to compress the image data by the low bit rate coding, a structural example of an addition and a detection of an accompany information will be described.

In FIG. 24, a configuration of an encoder is shown. In the image data inputted, at first, in the watermark adding device 1, an accompany information signal f is referred. Referring to this accompany information signal f, it is decided whether or not a process of adding a watermark is implemented, and thereafter, the accompany information signal f image data is inputted into the encoder 2, and the sign bit train is generated by implementing the low bit rate coding.

In FIG. 25, a configuration of a decoder is shown. The sign bit train inputted is decoded to the image data in the decoder 21. Thereafter, the accompany information signal f is detected in the watermark detector 22.

When the image data is not low bit rate coded, it needs to use a configuration having neither the encoder 2 of FIG. 24 nor the decoder 21 of FIG. 25.

The configurations of the watermark adding device 1 and the watermark detector 22 are shown in FIGS. 26 and 27, respectively.

In the watermark adding device 1 of FIG. 26, the image data inputted is added with a watermark in the watermark image generator 11, using a watermark pattern being recorded in the watermark pattern holding memory 12, when the accompany information signal f is turned on. The watermark image generator 11 outputs the image data inputted just as it is, when the accompany information signal f is turned off. In this case, the accompany information signal f is, for example, a signal of 1 bit and the like, and it is only needed to evaluate an information of on/off thereof.

A sequence of processes to be implemented in the watermark adding device 1 is shown in FIG. 28. At first, in step S81, setting predetermined values to the addition levels a, b of the watermark. The values of a, b could be arbitrary values, but the same values are used until the processes for all pixels of the subjected areas are completed. In step S82, setting the area whose size is equal to the size of area of the watermark pattern on the image subjected to implement an addition of the watermark, and checking against the watermark patterns for each of the pixels within the area. In step S83, implementing an evaluation of a symbol of the watermark, and when the symbol of the watermark to which the pixel corresponds is a plus, then in step S84, a is added to the pixel. When the symbol of the watermark to which the pixel corresponds is a minus, then in step S85, b is subtracted from the pixel. This process is, in step S86, repeated until it is determined to be implemented for all pixels in the subjected area.

In the watermark detector 22 of FIG. 27, for the image data inputted thereto, the evaluation value is calculated in the evaluation value calculation device 31, using the watermark pattern recorded in the watermark pattern holding memory 32. The watermark pattern stored in this watermark pattern holding memory 32 is the same watermark pattern stored in the watermark pattern holding memory 12 of the watermark pattern adding device 1. The calculated evaluation value is threshold-processed in the evaluation value comparator 33, and an accompany information signal f is outputted therefrom. Further, the image data inputted is outputted as just it is, or as being implemented with a processing or a predetermined process. This will be described later.

FIG. 29 shows a series of processes to be implemented in the watermark detector 22. At the beginning, in the step S91, settings of the initialization of the evaluation value sum and the threshold th are implemented. In the step S92, setting an area equal to an area of the watermark pattern in size, and verifying each pixel within the area with the watermark pattern. When the symbol of the watermark to which the pixel corresponds is determined as a plus, in the step S93, then, in the step S94, the pixel value thereof is added to the evaluation value sum. When the symbol of the watermark is determined as a minus, then, in the step S95, the pixel value thereof is subtracted from the evaluation value sum. These processes are repeated until it is determined that the processes are implemented for all pixels in the subjected area. Thereafter, in the step S97, comparing the evaluation value sum with the threshold th, and if sum>th, it is assumed that the watermark is added, and then in the step S98, turning on the accompany information signal f. If not, then, in the step S99, turning off the accompany information signal f.

The accompany information signal f is, when preventing an unauthorized duplication, is utilized as following. For example in case of the decoder of FIG. 25, the image data and the accompany information signal f outputted are passed to an image display unit (not shown). In the image display unit, when the accompany information signal f is on, it. is displayed as just it is, but when the accompany information signal f is off, the processing or the processes such as, for example, not displaying the image, not displaying the main area of the image data, scrambling the image (i.e., displaying the received image data randomly), are implemented. Or, providing the image converter 34 shown in the watermark detector 22 of FIG. 27, it may be configured to implement such processing or processes of the image data according to the accompany information signal f.

In the above described two different methods of adding the information accompanying with the image data to the image data thereof, there are the problems as described below.

In the first method of adding an accompany information to an auxiliary part of the image data, when the auxiliary part to which the accompany information is added is ignored, it becomes difficult to prevent the problems such as the unauthorized duplication and the like. For example, when reading the image data recorded digitally into a commercial personal computer, and copying the main part by cutting out the main part only with ignoring the auxiliary part, an image quality thereof becomes completely the same as the one before copying. In this case, the meaning of adding the accompany information to the auxiliary part is completely lost.

In the second method of adding an accompany information to a main part of the image data, there is no such a case that the added accompany information is to be diminished, by the copying procedures and the like as described in the above-mentioned first method, for example. However, when implementing the various kinds of signal processes such as the noise reduction filters and the like for the image data, the added accompany information component is damped and thus it becomes inextractable.

In particular, when the original image data themselves are compressed using the low bit rate coding such as the JPEG or the MPEG, there is so much harmful influence to be exerted as a result of the quantization process thereof. The added accompany information component is amplified to a degree of visually detectable, by the quantization process of the low bit rate coding, and thus the image quantity thereof is degraded, or damped to a degree of inextractable, thereby the original meaning thereof is to be lost.

In order that the components of the accompany information are not changed by these signal processes, there is a method of adding the accompany information using a special area in the image. However, since such area exists only in a portion of the entire image sequence, the area of the watermark pattern can not be taken as sufficiently large. As a result, even when no accompany information is added, the evaluation value turns to be large other than 0, so if using an absolute evaluation reference that evaluates as the accompany information is added when it exceeds a certain threshold, the detection of the accompany information becomes very difficult.

Further, when the area to which the addition of the accompany information is implemented is merely a portion of the entire image sequence, it becomes extremely difficult to add a plurality of information. For example, when adding the accompany information by dividing the entire image into the k areas, an area of the watermark pattern for each area becomes narrower according to the number of areas, thereby the accompany information becomes almost undetectable.

The above-described problems are more pronounced in the motion image sequence, in particular.

SUMMARY OF THE INVENTION

It is an object of the present invention to enabling to indisputably detect an accompany information without exerting much influence on the original image data, in a view of such situations described as above.

The present invention relates to an apparatus and a method of processing an image data, a transmission medium, as well as a recording medium. In detail, in an image data processing of processing an image data in which an accompany information is embedded as a watermark, having a memory which stores the patterns of the watermark, setting a phase of a pattern of the watermark being stored in the memory, to a first phase or a second phase, calculating a first evaluation value corresponding to a pattern of the watermark of the first phase, of the image data inputted, and a second evaluation value corresponding to a pattern of the watermark of the second phase, and comparing the first evaluation value, and a value corresponding to the second evaluation value.

Further, when an accompany information is to be embedded as a watermark for an image data, it has a first memory for storing a pattern of the watermark; a second memory for storing a relationship of a plurality of accompany information signals and a phase of said watermark; and then selecting a phase of the watermark corresponding to the accompany information signal inputted; reading a pattern of the watermark being stored in the second memory, and for setting to a phase selected by the selecting means; and adding a watermark of the phase set to the image data.

Moreover, in case of processing an image data into which an accompany information is embedded as a watermark, having a first memory for storing a pattern of the watermark, having a second memory for storing a relationship of a plurality of accompany information signals and a phase of the watermark, setting a phase of a pattern of the watermark being stored in the first memory, to a first phase and a second phase, comparing the first evaluation value corresponding to a pattern of the watermark of the first phase, of the image data inputted, and the second evaluation value corresponding to a pattern of the watermark of the second phase, comparing the values corresponding to the first and the second evaluation values, and then, selecting an accompany information signal from the second memory in accordance with a result of the comparison.

BRIEF DESCRIPTION OF THE DRAWINGS

FIG. 29 is a flowchart illustrating an operation of the watermark detector 22 in FIG. 26.

DESCRIPTION OF THE PREFERRED EMBODIMENTS

In the following, the preferred embodiments of the present invention will be described.

Figure 1:
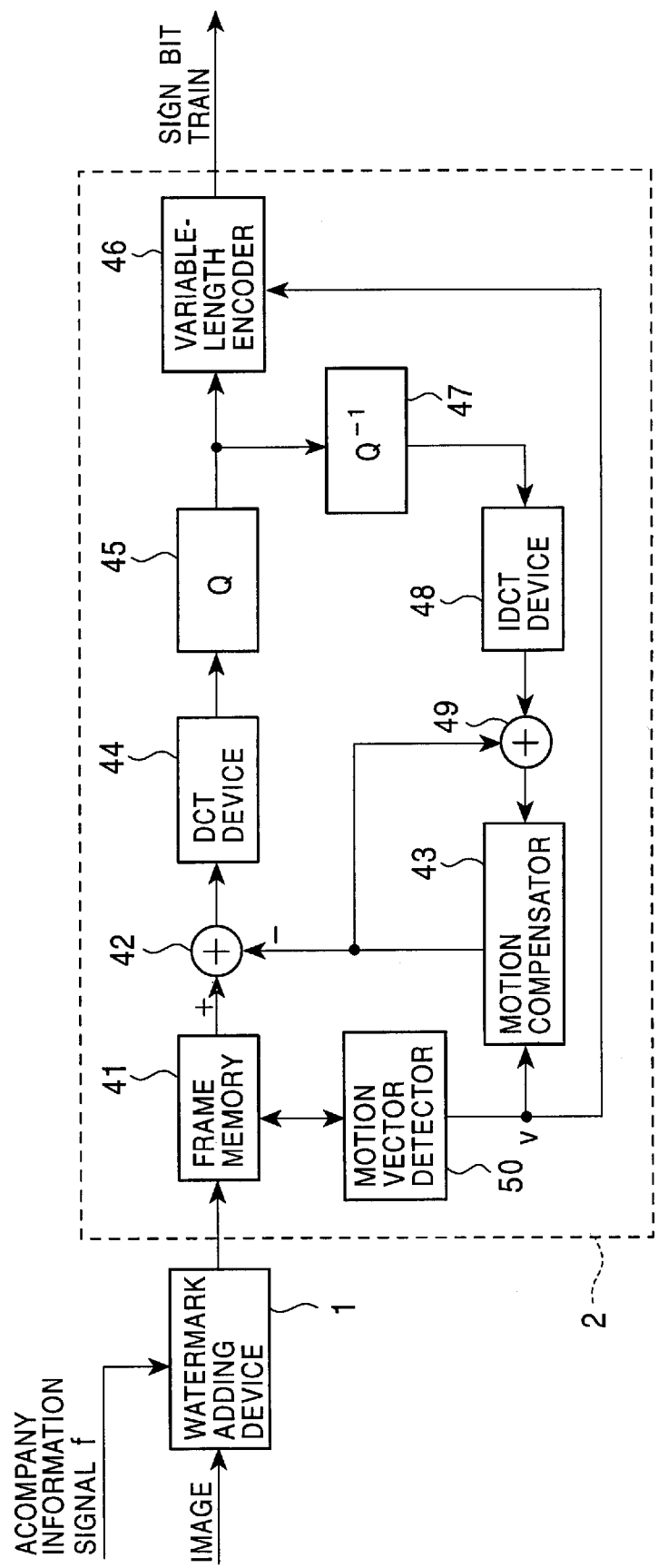
FIG. 1 is a block diagram showing a configuration example of an encoder for which the present invention is applied.
Figure 24:
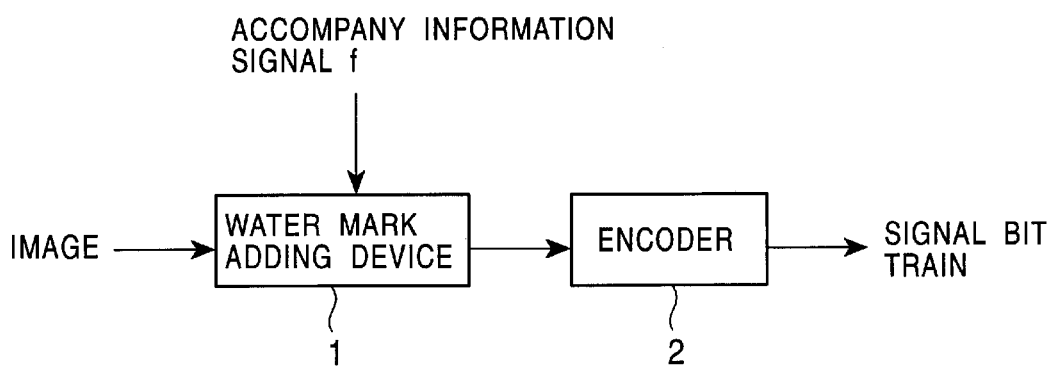
FIG. 24 is a block diagram showing a configuration example of a conventional encoder.

FIG. 1 shows a configuration example of an encoder for which the present invention is applied, and the parts corresponding to the ones shown in FIG. 24 are labeled with the same reference numerals. A fundamental configuration thereof is similar to the one shown in FIG. 24, but in FIG. 1, a much concrete configuration example of the encoder 2 is shown. In this example, the encoder 2 comprises a frame memory 41, and the frame memory 41 is adapted to store the image data supplied from a watermark adding device 1, with a frame unit. A motion vector detector 50 detects a motion vector v from the image data stored in the frame memory 41, and outputs the detected result to a motion compensator 43 and a variable-length encoder 46. In the motion vector detector 50, a block matching process is implemented with a macro-block unit consisting of 16×16 pixels, and the motion vector v is detected. In order to implement much higher precision, a matching process with a half-pixel unit is also conducted.

The motion compensator 43 has a built-in frame memory, and predicts a pixel value of each position in a current frame to be encoded, from the image being saved in the built-in frame memory, wherein the image having been already encoded, and being obtained by decoding it. A predict value I'{i,j,t} of a pixel value I{i,j,t} in a position (i, j) of a frame inputted at a time t is determined by using a motion vector v=(vx(i,j,t), vy (i,j,t)) corresponding to that position, as follows.

$$I'\{i,j,t\}=(I\{i',j',t-T\}+I\{i'+1,j',t-T\}+I\{i',j'+1,t-T\}+I\{i'+1,j'+1,t-T\})/4$$

wherein, i' and j' are expressed as follows $$i'=int(i+vx(i,j,t)T)$$

$$j'=int(j+vy(i,j,t)T)$$

Here, T represent a time difference between a time when the image I of which a prediction is currently underway has been inputted, and a time when the image being stored in the frame memory has been inputted, and (I{i', j', t−T}+I{i'+1, j',t−T}+I{i', j'+1, t−T}+I {i'+1, j'+1, t−T}), on the right-hand side of the above equation represent the image value on the built-in frame memory in the motion compensator 43. Further, int (x) represents a maximum integer value not exceeding the x.

A subtracter 42 subtracts a prediction value calculated by motion- compensating, based on the motion vector v supplied from the motion compensator 43, from the pixel value to be encoded currently, supplied from the frame memory 41, and outputs it the result to a DCT device 44. The DCT device 44 implements a two-dimensional DCT (Discrete Cosine Transform) process for the block of 8×8 pixels consisting of a differential value inputted from the subtracter 42. A quantizer 45 implements a quantization process according to the following equation, using a suitable step size Q, for the DCT coefficient c inputted from the DCT device 44:

$$c'=int(c/Q)$$

The DCT coefficient c' quantized by the quantizer 45 is supplied to the variable-length encoder 46 and an inverse quantizer 47. The variable-length encoder 46 variable-length encodes the DCT coefficient c' quantized by the quantizer 45 and the motion vector v supplied from the motion vector detector 50, and outputs a sign bit train.

The inverse quantizer 47 implements an inverse quantization process as shown in the following equation, using the step size Q that is the same as the step size used in the quantizer 45:

$$c''=c'\times Q$$

The data that is inverse-quantized in the inverse quantizer 47 is inputted to the IDCT device 48, and an inverse-DCT process is implemented on it, thereby the differential value of the pixel value is reproduced.

The differential value outputted from the IDCT device 48 is added with the prediction value outputted from the motion compensator 43 by an adder 49, and is turned to be the data of an original pixel value, and is stored in the built-in frame memory in the motion compensator 43.

In the following, an operation thereof will be described. The image data being digitized is inputted into the watermark adding device 1, and a watermark is added corresponding to an accompany information signal f. The configuration and its process of the watermark adding device 1 will be described later with reference to FIG. 3.

The image data to which the watermark is added by the watermark adding device 1 is supplied to the frame memory 41, and stored with the frame unit. The motion vector detector 50 detects the motion vector v of the image data stored in the frame memory 41. The motion compensator 43 implements a motion compensation for the image data of the reference frame stored in the built-in frame memory, and generates a prediction image data, and supplies it to the subtracter 42. The subtracter 42 subtracts the prediction image data supplied from the motion compensator 43 from the image data supplied from the frame memory 41, and supplies the subtract result to the DCT device 44. The DCT device 44 converts the image data of the differential value inputted to the DCT coefficient. The quantizer 45 quantizes the DCT coefficient supplied from the DCT device 44, and outputs to the variable-length encoder 46. The variable-length encoder 46 converts the quantization data inputted to a variable-length code, and then transmits it to a transmission line (not shown) or supplies it to a recording media, as a sign bit train, and records it.

The quantization data outputted from the quantizer 45 is inverse-quantized in the inverse-quantizer 47, and is supplied to the IDCT device 48. The IDCT device 48 implements an IDCT process for the DCT coefficient inputted, and outputs the image data of the original differential value. The image data of the differential value is added to the prediction image data read by the motion compensator 43 in the adder 49, and is reproduced to the original image data, and is stored in the built-in frame memory of the motion compensator 43.

Further, the variable-length encoder 46 converts the motion vector v supplied from the motion vector detector 50 to a length-variable code, and outputs it.

Figure 26:
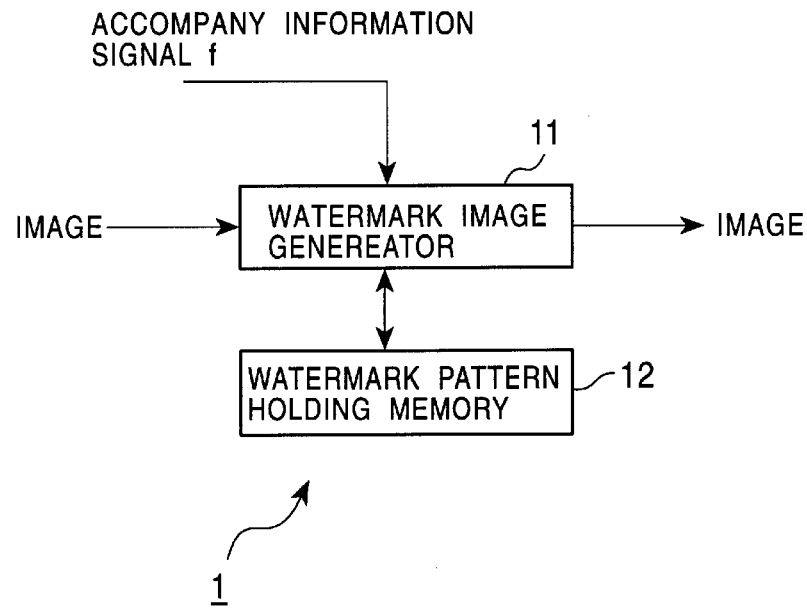
FIG. 26 is a block diagram showing a configuration example of the watermark adding device 1 in FIG. 23.

The watermark adding device 1 in the first embodiment is configured as shown in FIG. 26, for example, the same as described above, and as described with reference to FIGS. 20 to 23, it will implement a process such that when the accompany information signal f is off, no watermark is added, and when it is on, then the watermark is added.

Figure 2:
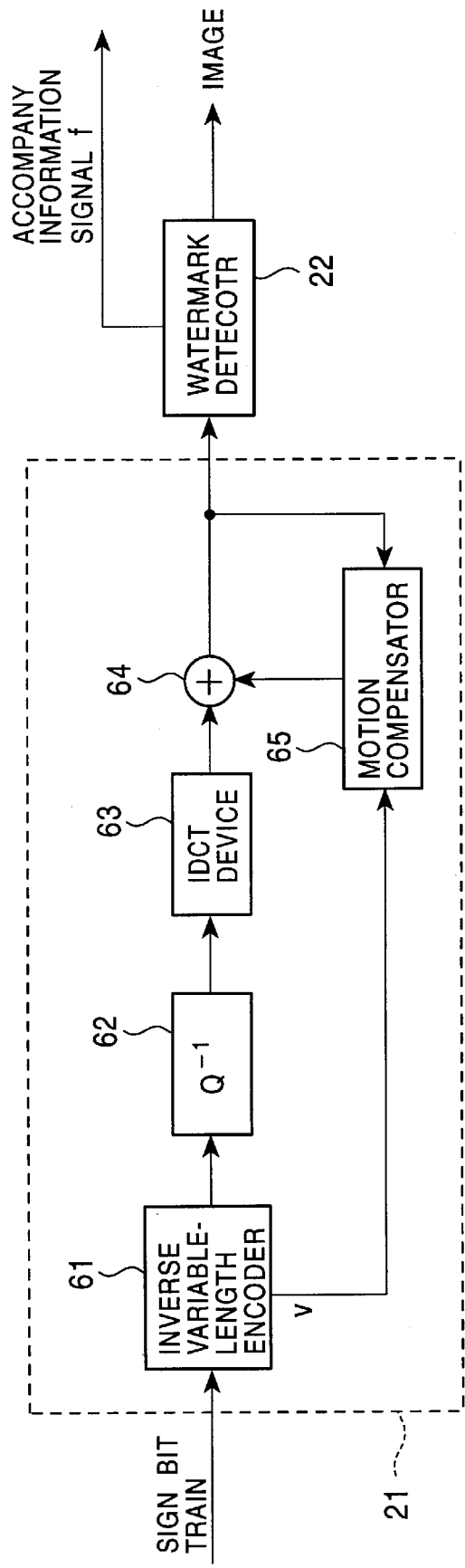
FIG. 2 is a block diagram showing a configuration example of a decoder for which the present invention is applied.
Figure 25:
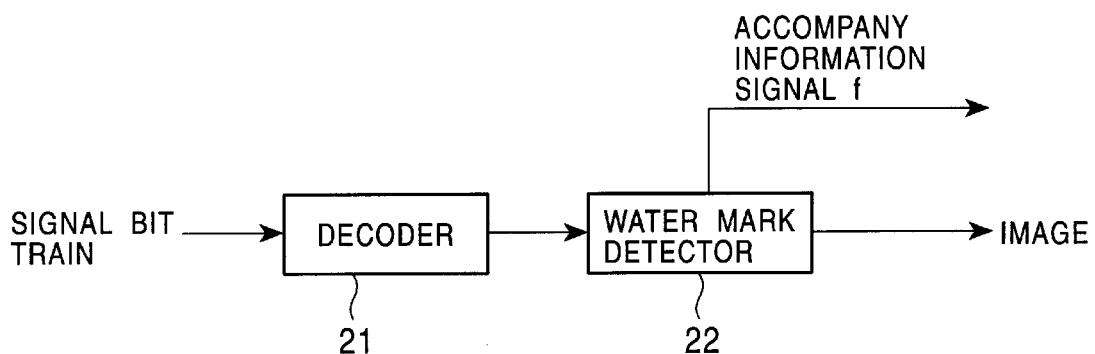
FIG. 25 is a block diagram showing a configuration example of a conventional decoder.

FIG. 2 shows a configuration example of the decoder that decodes the sign bit train encoded by the encoder shown in FIG. 1. In FIG. 2, the parts corresponding to the ones shown in FIG. 25 are labeled with the same reference numerals. In this configuration, it is so configured that an inverse-variable length encoder 61 of the decoder 21 inverse-variable length encoding processes (the variable length decoding process) the sign bit train inputted, outputs the decoded image data (DCT coefficient) to the inverse-quantizer 62, and outputs the decoded motion vector v to the motion compensater 65. The inverse-quantizer 62 inverse-quantizes the DCT coefficient inputted, and outputs to the IDCT device 63. The IDCT device 63 implements an IDCT process for the inverse-quantized DCT coefficient, and outputs it to the adder 64 by reproducing it to the image data of the original differential value.

The motion compensater 65 implements a motion compensation based on the motion vector v supplied from the inverse variable-length encoder 61 for the image data stored in the built-in frame memory, and generates a prediction image, and outputs it to the adder 64. The adder 64 adds the differential value supplied from the IDCT device 63, for the prediction image, and outputs the original image data by reproducing it.

An output of the adder 64 is supplied to the frame memory built-in the motion compensator 65, and is stored therein, as well as is supplied to the watermark detector 22. The watermark detector 22 detects the accompany information signal f from the image data inputted, and outputs it, as well as outputs the original image data.

Figure 3:
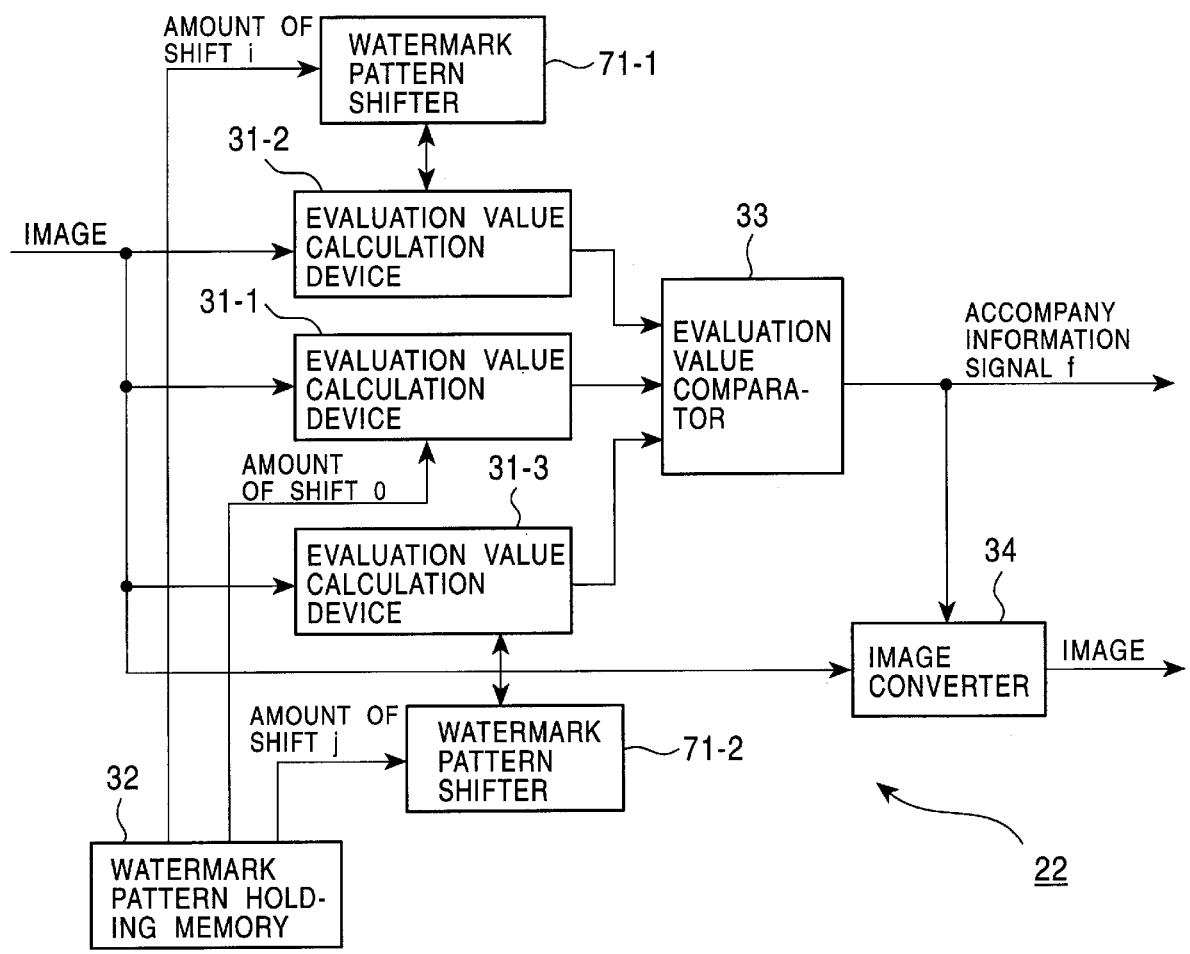
FIG. 3 is a block diagram showing a configuration example of the watermark detector 22 in FIG. 1.
Figure 27:
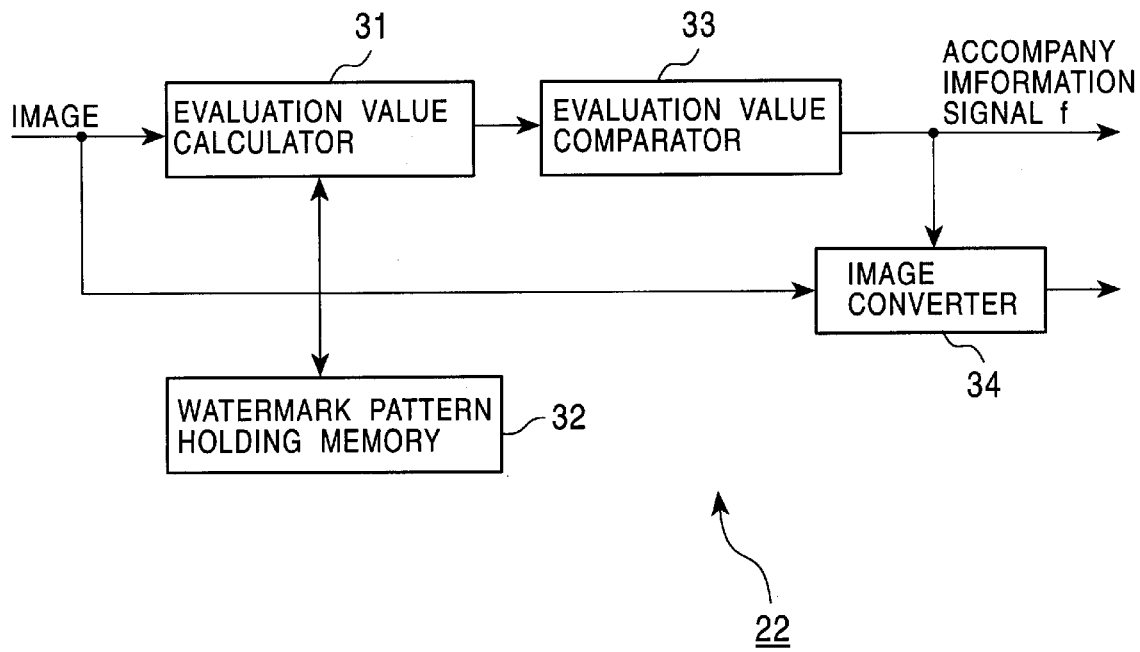
FIG. 27 is a block diagram showing a configuration example of the watermark detector 22 in FIG. 24.
Figure 28:
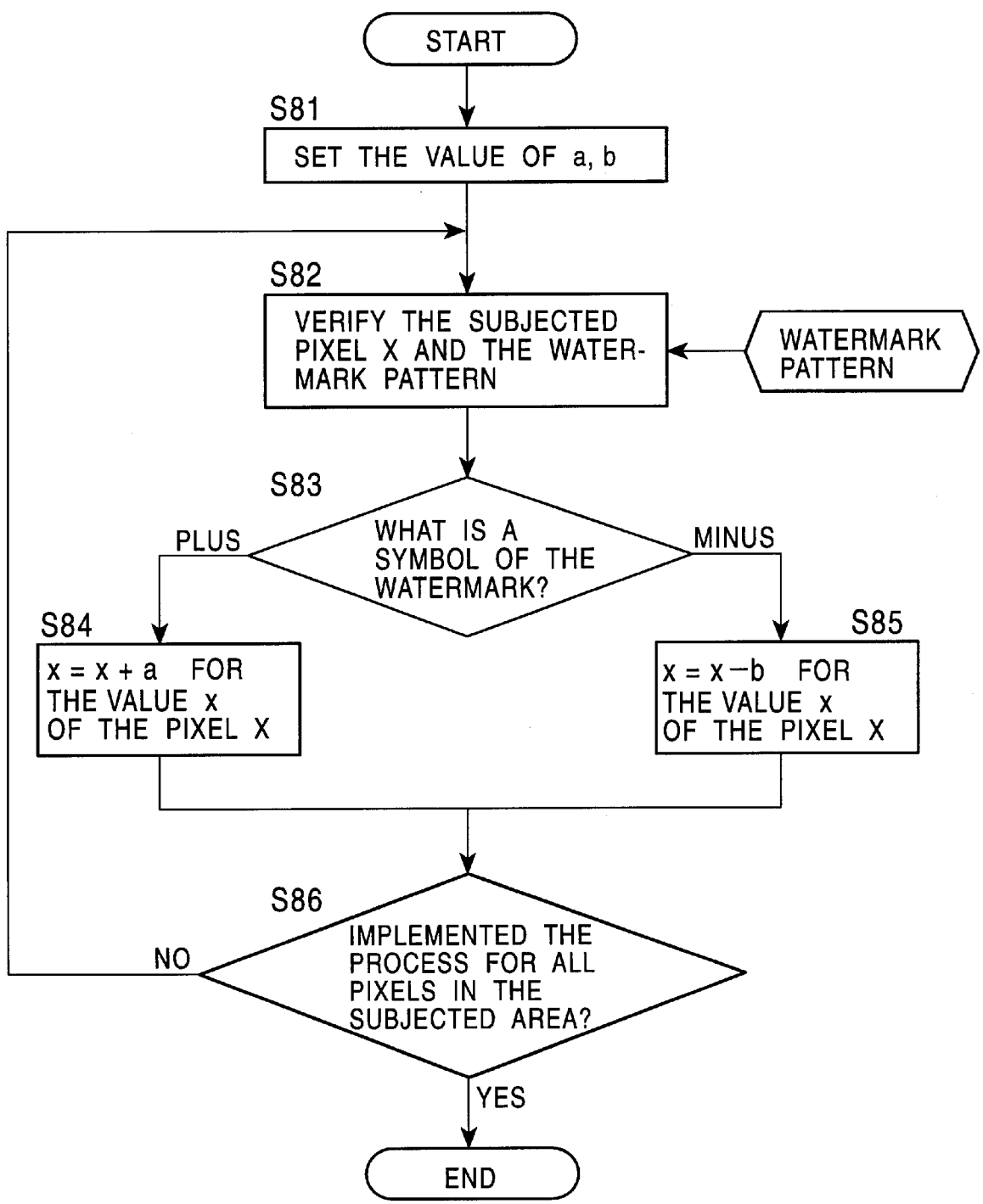
FIG. 28 is a flowchart illustrating an operation of the watermark adding device 1 in FIG. 25.

The watermark detector 22 shown in FIG. 2 is configured as shown in FIG. 3, for example. In the figure, the parts corresponding to the ones shown in FIG. 27 are labeled with the same reference numerals. The image data outputted from the adder 64 of the decoder 21 is inputted into a plurality of (in this embodiment, just three) evaluation value calculation devices 31-1~31-3, respectively. In the watermark pattern holding memory 32, the watermark pattern which is the same watermark pattern held in the watermark pattern holding memory 12 (FIG. 26) of the watermark adding device 1 is being held. The watermark pattern shifter 71-1 shifts the watermark read from the watermark pattern holding memory 32, with an amount of shift i, and supplies it to the evaluation value calculation device 31-2. Similarly, the watermark pattern shifter 71-2 shifts the watermark read from the watermark pattern holding memory 32, with an amount of shift j, and supplies it to the evaluation value calculation device 31-3. To the evaluation value calculation device 31-1, the watermark read from the watermark pattern holding memory 32 is supplied with an amount of shift 0 (i.e., substantially without being shifted).

Each of the evaluation value calculation devices 31-1~31-3 calculates an evaluation value of the image data, based on the watermark pattern supplied, and outputs the calculated evaluation value to the evaluation value comparator 33. The evaluation value comparator 33 threshold-calculates the evaluation value inputted, and outputs an accompany information signal f.

An image converter 34 implements a predetermined process on the image data inputted in correspondence with the accompany information signal f outputted from the evaluation value comparator 33.

In the following, with reference to FIGS. 4 and 5, an operation of the watermark detector 22 will be described. At first, in the step S1, the evaluation value comparator 33 sets a predetermined value on the threshold th. Then, in the step S2, a process of obtaining an evaluation value sum_n for the image of the current frame, when using the watermark pattern of the amount of shift 0, in the evaluation value calculation device 31-1, is started. In the step S3, in the evaluation value calculation device 31-1, an evaluation value calculation process is implemented. The details of this evaluation value calculation process is shown in FIG. 5.

In the evaluation value calculation process, in the step S21 at the beginning, 0 is initially set to the evaluation value sum. Then, in the step S22, the subjected pixel X and the watermark pattern of the amount of shift z (in the present case, the amount of shift is 0) are verified. In the step S23, then, it is determined whether the symbol of the watermark is a plus or a minus. When the symbol of he watermark is a plus, it proceeds to the step S24, and a process of adding the pixel value x of the pixel X to the evaluation value sum is implemented. When the symbol of he watermark is a minus, in the step S25, a process of subtracting the pixel value x from the evaluation value sum is implemented.

Figure 20:
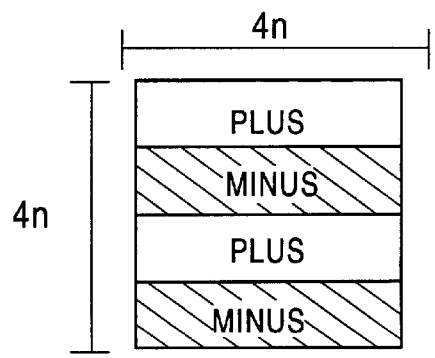
FIG. 20 is a diagram showing an example of a pattern of a watermark.
Figure 21:
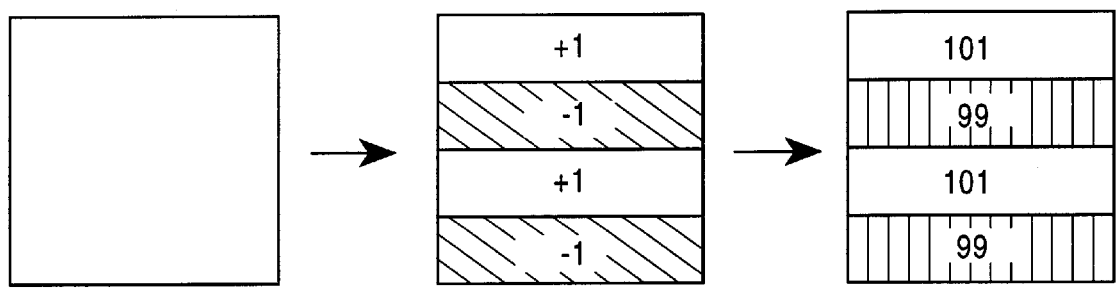
FIG. 21 is a diagram illustrating an adding process of a watermark.
Figure 22:
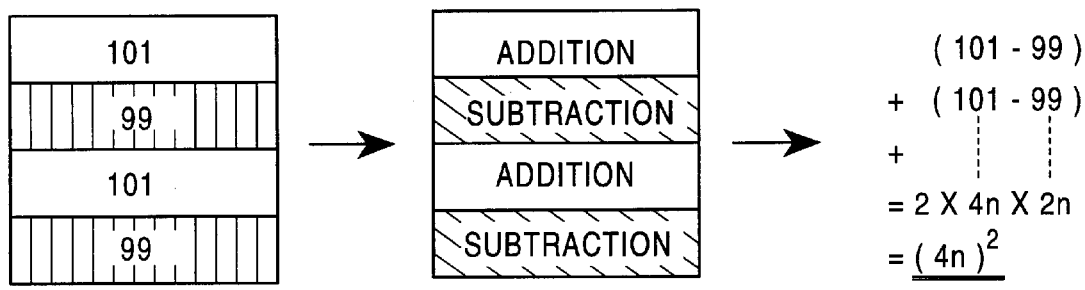
FIG. 22 is a diagram illustrating a calculation of an evaluation value when a watermark is added.
Figure 23:
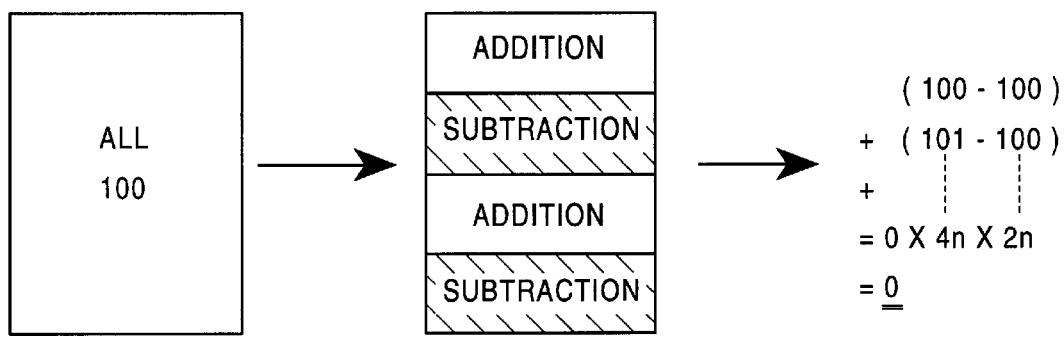
FIG. 23 is a diagram illustrating a calculation of an evaluation value when a watermark is not added.

Next, in the step S26, it is determined whether or not the similar processes are implemented for all pixels in the subjected area. When there is a pixel on which the process has yet been implemented, returns to the step S22, and the following steps from that step will be implemented repeatedly. For example, when the watermark pattern is such a patter as shown in FIG. 20, it is determined whether or not the similar processes have been implemented for all pixels of 4n×4n. When it is determined that the processes have been completed for all pixels, it proceeds to the step S27, and the evaluation value sum calculated in the steps S24, S25 is set to the evaluation value sum_n.

Figure 4:
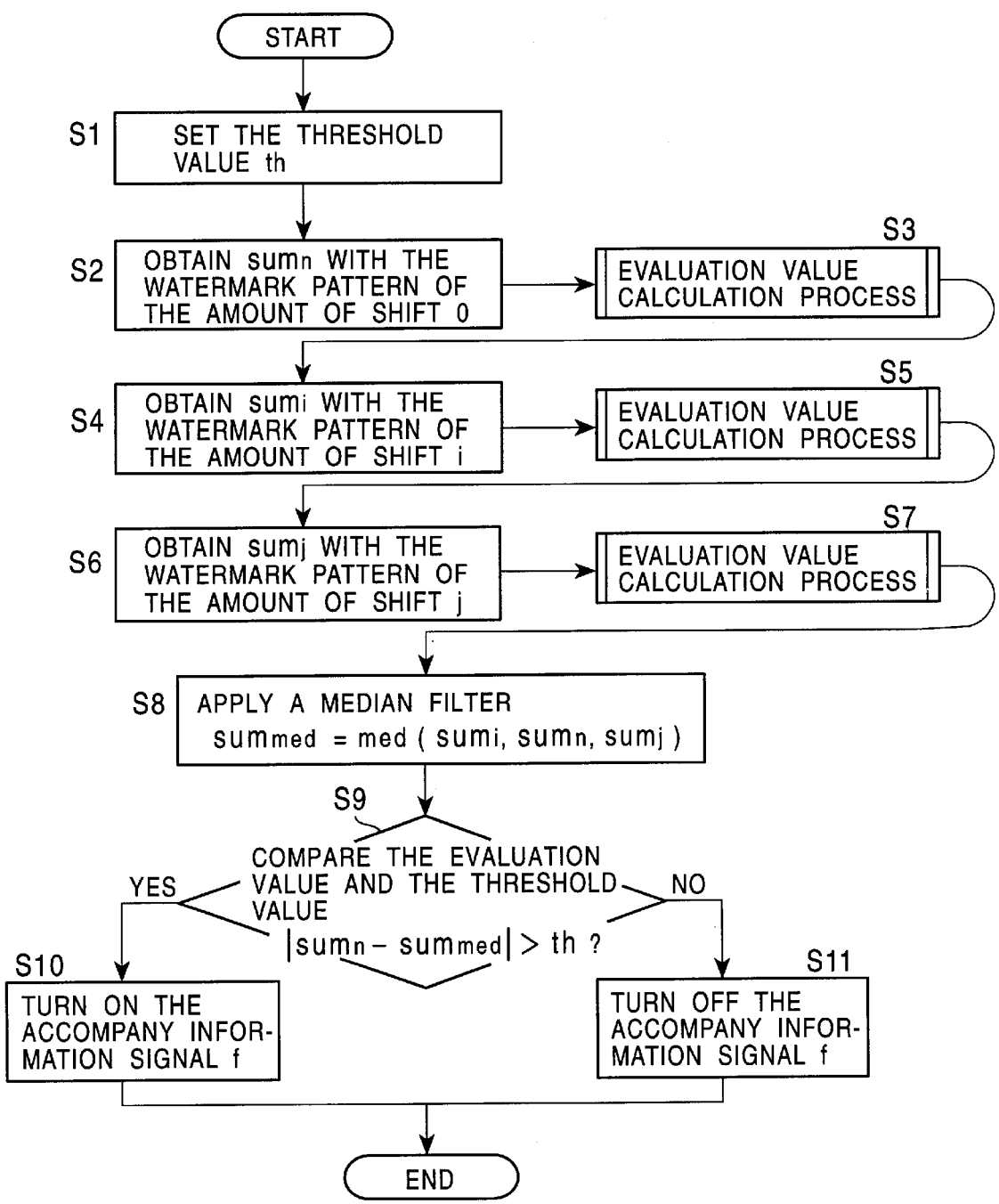
FIG. 4 is a flowchart illustrating an operation of the watermark detector 22 in FIG. 3.
Figure 5:
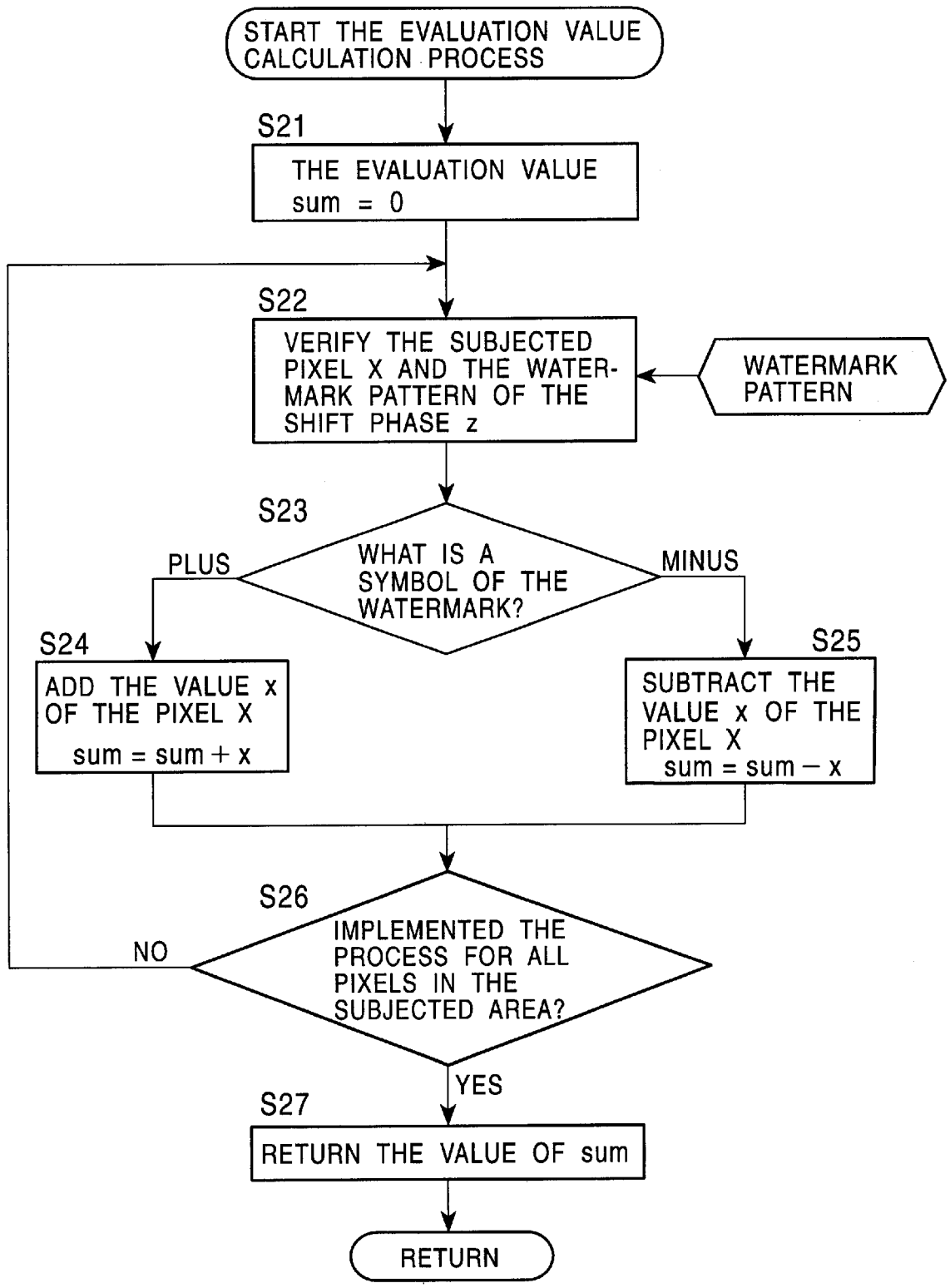
FIG. 5 is a flowchart showing a detail of the evaluation value calculation process of the steps S3, S5, S7 in FIG. 4.

Then, proceeds to the step S4 in FIG. 4, in the evaluation value calculation device 31-2, a calculation of obtaining the evaluation value sum_i with the watermark pattern of the amount of shift i is started. Then, proceeds to the step S5, in the evaluation value calculation device 31-2, the evaluation value calculation process is implemented. This evaluation value calculation process is substantially the same process of the evaluation value calculation process implemented in the step S3. That is, the processes shown in the flowchart in FIG. 5 are similarly implemented as described above. The evaluation value sum obtained in the step S27 is set to be the evaluation value sum_i.

Next, proceeds to the step S6, in the evaluation value calculation device 31-3, a calculation of obtaining the evaluation value sum_j with the watermark pattern of the amount of shift j is started. Then, in the step S7, the evaluation value calculation process is implemented. This evaluation value calculation process is substantially the same process of the evaluation value calculation processes shown in the steps S3 and S5. That is, the processes shown in the flowchart in FIG. 5 are implemented. Then, the evaluation value sum obtained in the step S27 is set to be the evaluation value sum_j.

The evaluation values sum_n, sum_i, and sum_j calculated in the evaluation value calculation devices 31-1~31-3 are inputted into the evaluation value comparator 33. The evaluation value comparator 33 implements a median filter for the three evaluation values inputted. That is, three evaluation values sum_n, sum_i, and sum_j are placed in order of a smaller one to a larger one, and the one having a middle size is selected, and then the evaluation value thereof is set to a reference value sum_med. Then, in the step S9, the evaluation value comparator 33 obtains an absolute value of a differential between the reference value sum_med as a standard evaluation value, and the actual evaluation value sum_n, and compares the absolute value with the threshold th set in the step S1. When a value of the absolute value of the differential is larger than the threshold th, it is assumed that the watermark is added, and in the step S10, the accompany information signal is turned on. In the contrary, when it is determined that the absolute value of differential is equal to or less than the threshold th, proceeding to the step S11, and the accompany information signal f is turned off by assuming that the watermark is not added.

Figure 6:
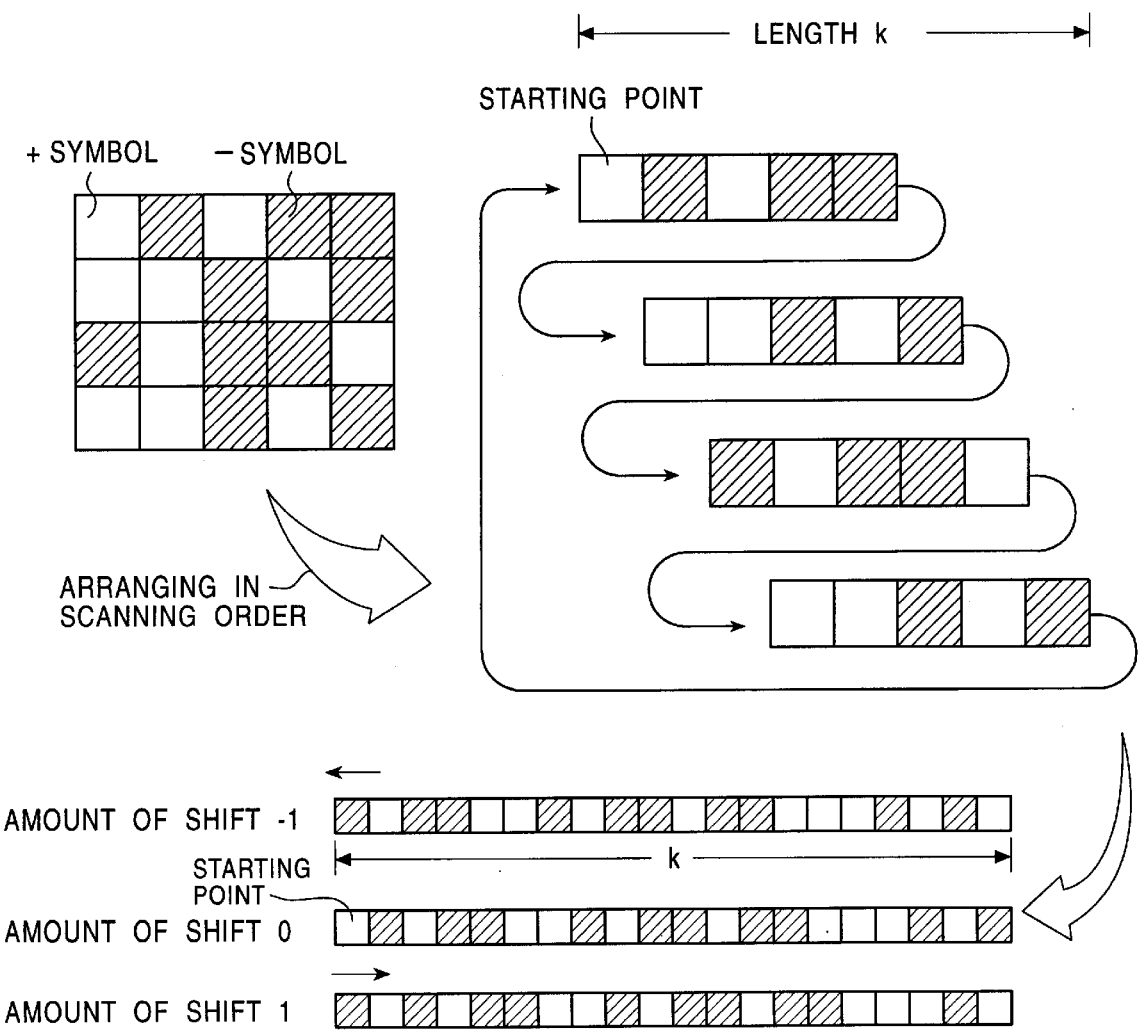
FIG. 6 is a diagram illustrating how to shift the pattern of the watermark.

At a time when shifting the watermark pattern, as shown in FIG. 6, a method of shifting the pattern of the watermark for one screen (consisting of k pixels), by amount for one pixel, in accordance with the scanning order of the image is adapted. Further, in FIG. 6, the white areas (pixels) represent the + symbols, and the black areas (pixels) represent the − symbols. At this time, a shifting unit is not limited to the one pixel unit, but it could be shifted with any arbitrary units. It is better to shift with the same amount from the amount of shift 0 to be a center such that the amount of shift is, as i>0, j<0, |i|=|j|, but an arbitrary amount is also acceptable. Further, it is not limited to the above shifting methods, and any shifting method will be fine.

The reason why the evaluation value is to be obtained by shifting the watermark pattern is as follows. That is, for example, when generating the watermark pattern by using the M-series, a correlation of the watermark pattern, which is arbitrarily shifted to the 0 or the position (phase) other than the periodic portion, and the original watermark pattern turns to be very low. In other word, for the watermark pattern that is used when the additional level is added, if a detection is made by using a slightly shifted watermark pattern, a bias component of the evaluation value (a difference between the evaluation value in case of the watermark pattern being added and the evaluation value in case of the watermark pattern being not added) becomes approximately 0. For example, in the case of being shown in FIGS. 22 and 23, the evaluation value $(4n)^2$ becomes approximately 0 when the detection is made by using the shifted watermark pattern.

As a result, the evaluation value that is obtained by shifting the watermark pattern can be considered as being approximately equal to the standard evaluation value when the watermark pattern is not added. Accordingly, since the evaluation value that is obtained by shifting the watermark pattern, and the evaluation value at a time when the amount of shift is 0 can be compared, i.e., a relative evaluation reference can be utilized, the detection of the watermark can be easily made. As a result, the detection of the watermark can be certainly made by using only the watermark pattern of a narrow area (for the M-series, the series of the lower degrees), without using the watermark pattern of a sufficiently wide area (for the M-series, the series of the higher degrees), such that the evaluation value at a time when the watermark is not embedded becomes approximately 0.

As shown in FIG. 6, the standard evaluation value may be configured by using a filter and the like, for all or the parts of the evaluation values that are obtained therefor, by using not only the amount of shift that is shifted one by one to and fro, but also a plurality of the amounts, respectively.

Further, when the amount of shift is set to a decimal precision, the evaluation value may be obtained by interpolating the watermark pattern or the pixel in the subjected area.

At a time when obtaining the standard evaluation value sum_med for the image of the current frame, any processing method may be used. Although the median filter is used in the above embodiment, the standard evaluation value may be obtained by using any processing method, such as utilizing the evaluation value of an arbitrary single phase as just it is, or as obtaining and utilizing the average value, the maximum value, the minimum values and the like for all or the parts of the plurality of evaluation values thereof. Among these methods, more complex processing methods such as, for example, the evaluation value at a time when the amount of shift is 0 is predicted or extrapolated, from the changes of the evaluation values at the time when shifting −2 and −1, are also included.

Further, at a time when implementing a comparison with the threshold by using the standard evaluation value and the practical evaluation value, any comparing method other than the one described above may be used. For example, by utilizing the fact that the bias component B of the evaluation value ($(4n)^2$ for the examples in FIGS. 22 and 23) is a constant, a comparison may be implemented with the bias confidence coefficient c ($0 \leq c \leq 1$) that indicates an assumption in what degree the bias component is being held.

For example, it may be assumed that the watermark is being added, in the case that the evaluation value at a time when the amount of shift 0 is larger with B×c than the one at a time when shifted by i forward, and also the evaluation value at a time when the amount of shift 0 is larger with B×c than the one at a time when shifted by j backward. Or it may be assumed that the watermark is being added, in the case that the evaluation value at a time when the amount of shift 0 is larger with B×c than the one at a time when shifted by either i, or j.

As a symbol of a watermark, any symbol other than a plus, a minus may be used. Also, any symbols of three kinds or more rather than two kinds may be used. For example, by preparing three kinds of symbols such as a plus, a zero, and a minus, any meaning may be given to each symbol such that no influence is exerted on the evaluation value sum (the pixel value is neither added to nor subtracted from the evaluation value sum), for the pixel of which the symbol is zero, at a time when verifying with the watermark pattern, and the like.

The area of which the watermark pattern is added on the image may be arbitrary shape and range. Further, so far as the matching with the added watermark pattern being maintained, the shape and the range of the area for which the evaluation value is obtained at a time of detecting may be arbitrary. Moreover, an addition and/or a detection of a watermark pattern may be implemented by using a wide area over a time-wise and/or a space-wise. For example in the motion image sequence, by using a time-wise reference, not only the time-wise position of the current frame, but also the past and/or the future frame may be utilized. For example, in a still image having a very large image size, treating one sheet of an image by dividing into a plurality of image areas with a certain unit, and by using a space-wise reference, for the image area subjected currently, the image areas located in front or at back thereof in the scanning order, for example, may be utilized.

As a second embodiment, introducing a new index such as a shift phase of a watermark pattern, and it may be arranged that for a value of each shift phase, a specific accompany information signal among a plurality of accompany information signals is to be corresponded. In this case, by shifting a phase of a watermark in multiple ways, the information corresponding to each of the watermarks with the different phases can be transmitted.

Figure 7:
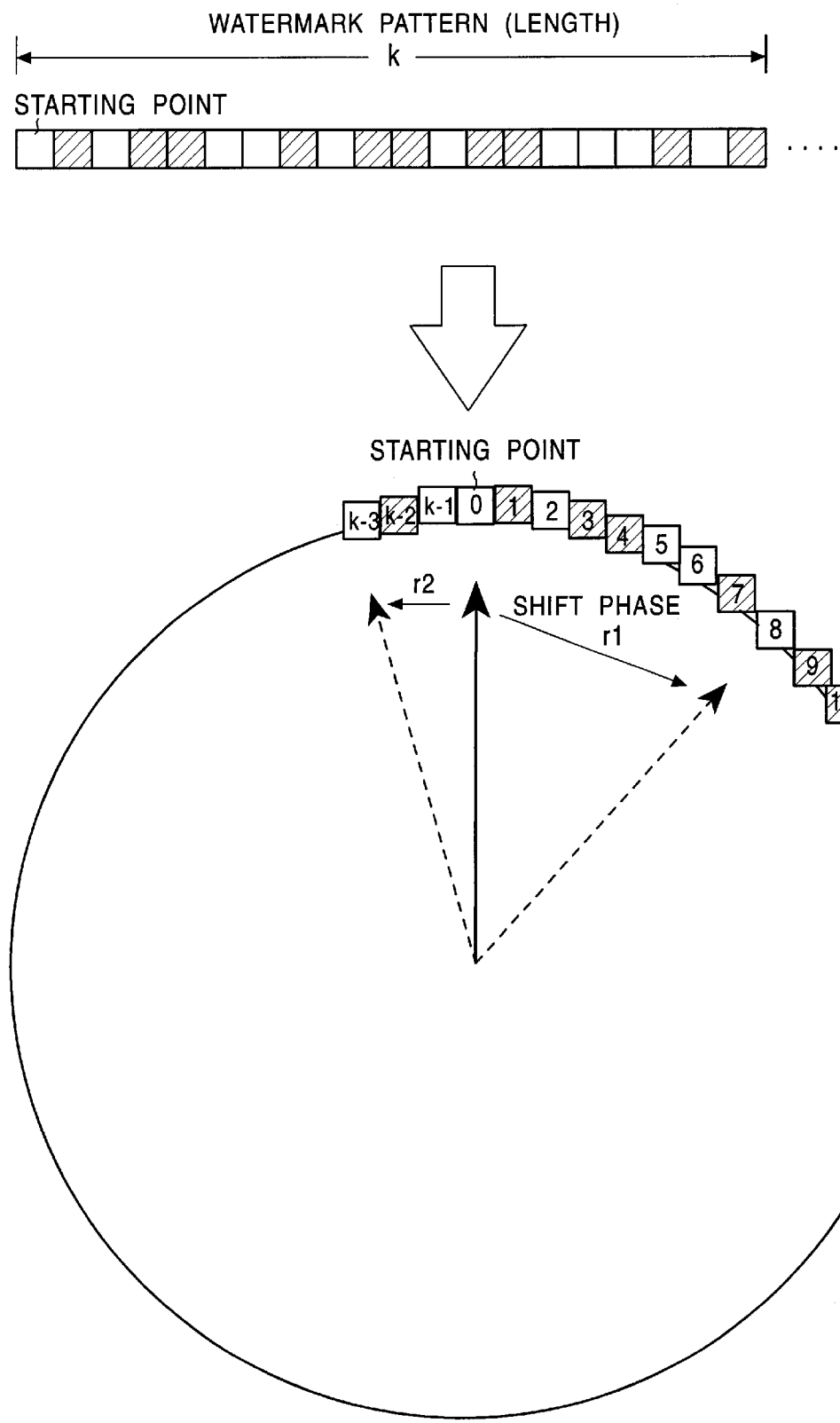
FIG. 7 is a diagram illustrating the shift phase of the pattern of the watermark.
Figures 8, 9:
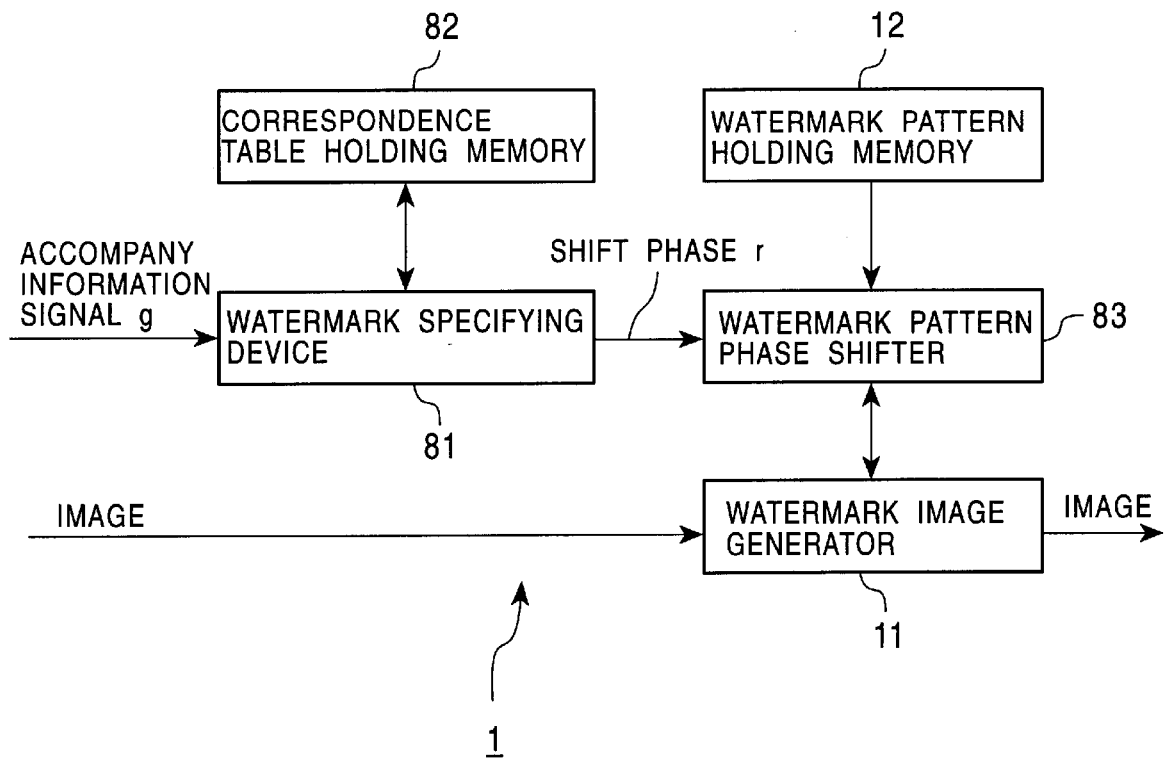
FIG. 8 is a block diagram showing a configuration example of the watermark adding device 1 in FIG. 1.
FIG. 9 is a diagram showing a correspondence table of the accompany information signal g and the shift phase r.

A general idea of such shift phase is shown in FIG. 7. As an example, when an optional watermark pattern of a length k is arranged in a clock-wise direction, and the last symbol and the symbol at the starting point are joined so as to make a circular shape, will be described. The watermark pattern of the shift phase r1 is a pattern that is generated by shifting from the starting point in a clock-wise direction for 8 pixels. The watermark pattern of the shift phase r2 is a pattern that is generated by shifting from the starting point in a counter clock-wise direction for −3 pixels. By providing different meanings for all or the parts of the shift phases, respectively, a correspondence table of which a value of a shift phase is specified according to an accompany information signal g is prepared. This correspondence table is, as shown in FIG. 9, arranged such that the shift phase r is specified in correspondence with each value of the accompany information signal g, and for example, the meanings such as no copy available, one time copy available, two times copy available, and the like are set, respectively. In this case, the accompany information signal g is, for example, 2-bits signal, so as to represent a plurality of information.

In this case, the watermark adding device 1 in FIG. 1 is configured as shown in FIG. 8. A correspondence table holding memory 82 is, as shown in FIG. 9, possesses the table representing a correspondence relation of the accompany information signal g and the shift phase r. By making a correspondence of the accompany information signal g inputted into the watermark specifying device 81 with the correspondence table possessed by the correspondence table holding memory 82, the shift phase r is set. The watermark pattern phase shifter 83 generates a watermark pattern of which a phase thereof is shifted for the shift phase r, with respect to the watermark pattern recorded in the watermark pattern holding memory 12. The watermark image generator 11 adds a watermark to the image data inputted, using the shifted watermark pattern.

Figure 10:
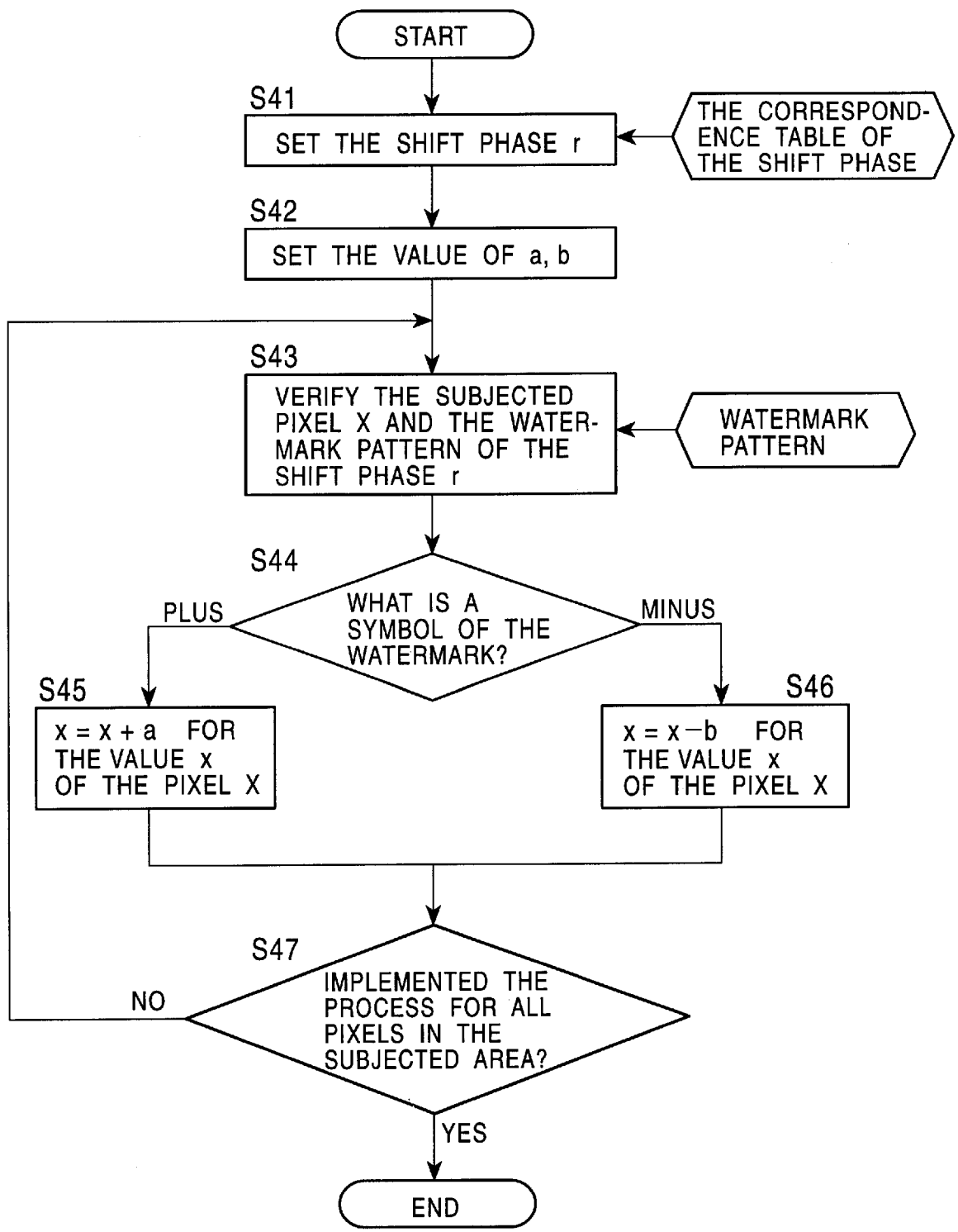
FIG. 10 is a flowchart illustrating an operation of the watermark adding device 1 in FIG. 8.

In this watermark adding device 1, a sequence of processes shown in FIG. 10 is implemented. At first, in the step S41, the watermark specifying device 81 sets the shift phase r, by verifying the accompany information signal g inputted, with the correspondence table in the correspondence table holding memory 82, and outputs it to the watermark pattern phase shifter 83. Then, in the step S42, the watermark image generator 11 sets predetermined values to the additional levels a, b of the watermark. Herein, setting of r, a, and b may be implemented in any order.

Next, in the step S43, the watermark image generator 11 sets an area equal to an area of the watermark pattern in size on the image subjected to implement an addition of the watermark, and verifies with the watermark pattern shifted with the shift phase r for each pixel within the area thereof. At this moment, the watermark pattern phase shifter 83 shifts the watermark held in the watermark pattern holding memory 12, for the shift phase r supplied from the watermark specifying device 81, and supplies it to the watermark image generator 11. The watermark image generator 11 determines a symbol of the watermark, in the step S44, and when the symbol of the watermark of the image is a plus, adding a to the pixel x in the step S45. When the symbol of the watermark of the image is a minus, b is subtracted from the image x. This process is to be repeated until it is determined that the process is, in the step S47, completed for all pixels in the subjected area.

Figure 11:
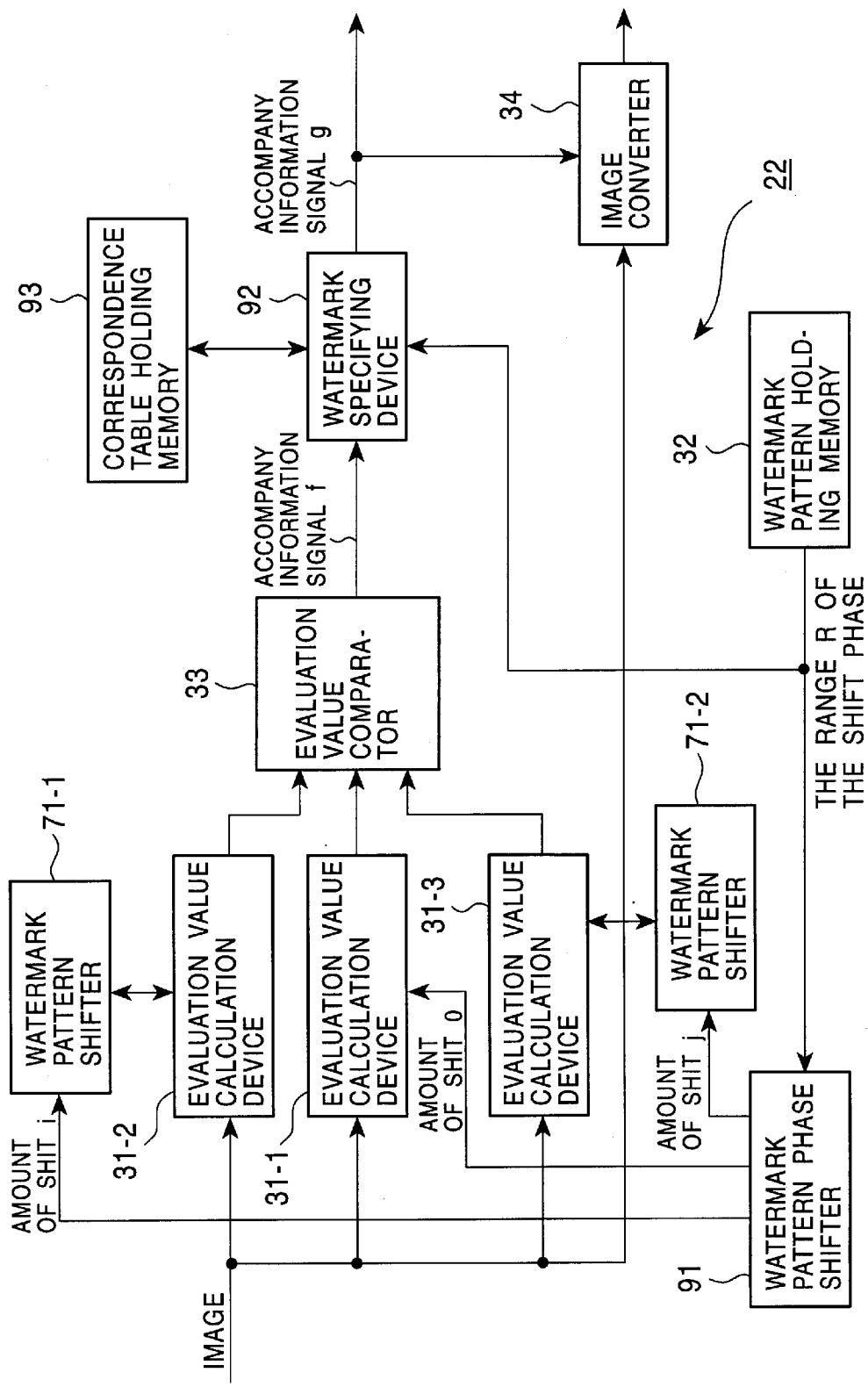
FIG. 11 is a block diagram showing another configuration example of the watermark detector 22 in FIG. 22.

As described above, when the phase of the pattern of the watermark is set in correspondence with the accompany information signal g, the watermark detector 22 in the decoder in FIG. 2, is configured as shown in FIG. 11. In FIG. 11, the parts corresponding to the ones shown in FIG. 3 are labeled with the same reference numerals. In this example, the watermark pattern holding memory 31 stores the watermark pattern and the range R [Rmin, Rmax] of the shift phase. The watermark pattern phase shifter 91 shifts the pattern of watermark supplied from the watermark pattern holding memory 32 by the shift phase r (r is within the range R of the shift phase) supplied from the watermark pattern holding memory 32, and outputs it to the evaluation value calculation device 31-1, the watermark pattern shifter 71-1, 71-2.

Further, the correspondence table holding memory 93 holds the correspondence table equal to the one held in the correspondence table holding memory 82 in FIG. 8. The watermark specifying device 92 specifies a kind of the accompany information signal g from the correspondence table held in the correspondence table holding memory 93, based on the content of the accompany information signal f supplied from the evaluation value comparator 33 and the shift phase at that time, and then outputs the specified accompany information signal g. Other configurations are the same as the ones in FIG. 3.

Figure 12:
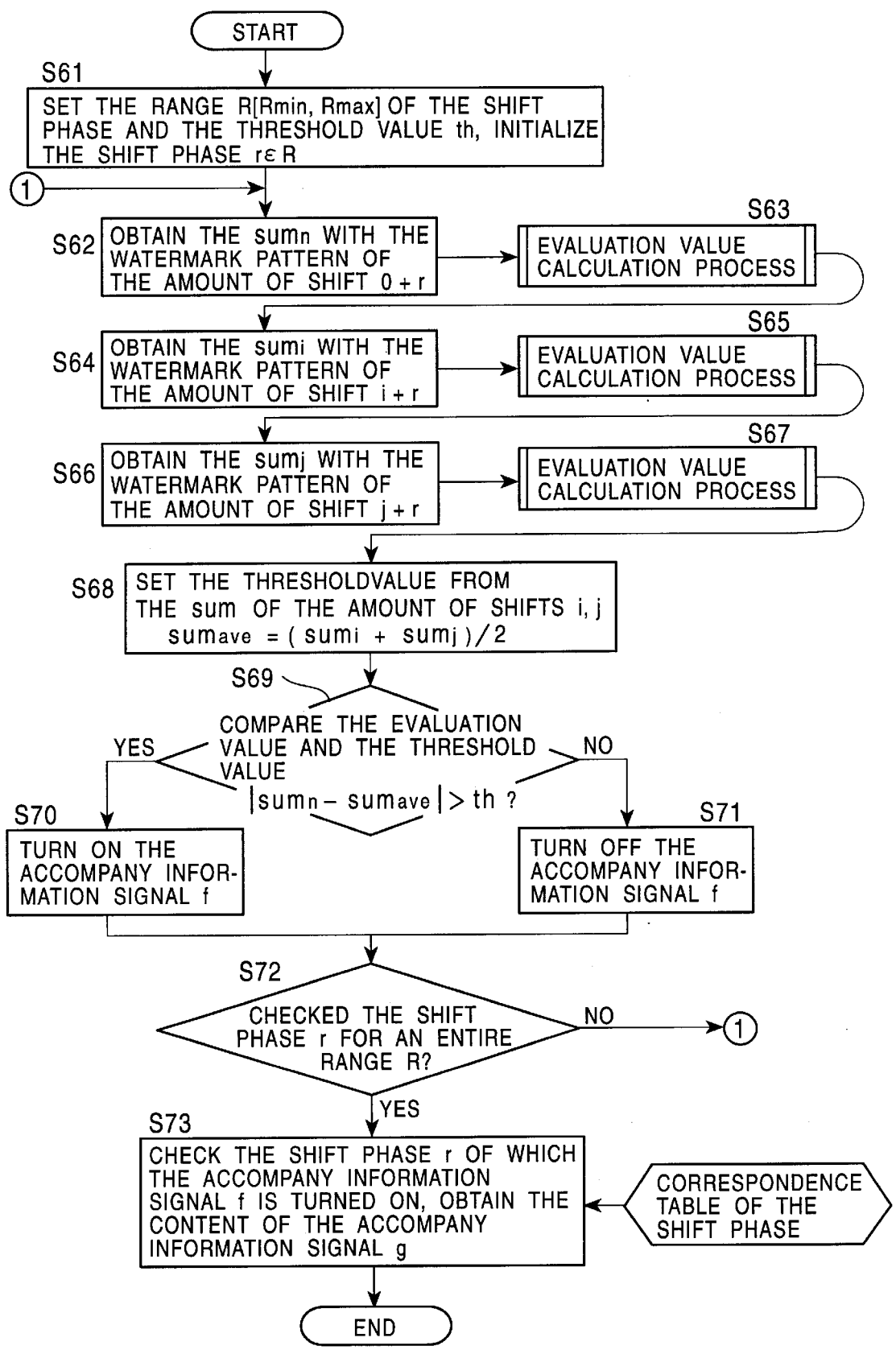
FIG. 12 is a flowchart illustrating an operation of the watermark detector 22 in FIG. 11.

In the watermark detector 22 in FIG. 11, a sequence of the processes shown in FIG. 12 is implemented. At first, in the step S61, settings of the range R[Rmin, Rmax] of the shift phase, the threshold th, and an initialization of the shift phase r (r is within the range of R) are implemented. In the step S62, by the watermark pattern phase shifter 91, in order to obtain the evaluation value sum_n for the image of the current frame, at a time when using the watermark pattern with the amount of shift 0, an amount of shift z=0+r of which the shift phase r is added to the amount of the shift phase 0, is set. Next, in the step S63, by the evaluation value calculation device 31-1, the evaluation value calculation process is implemented. The evaluation value calculation process is the same process as shown in FIG. 5, and thus, herein, the description thereof will be omitted.

Next, in the step S64, in order to obtain sum_i with the watermark pattern of the amount of the shift phase i+r, by the watermark pattern phase shifter 91 and the watermark pattern shifter 71-1, the amount of shift z=i+r is set. Then, in the step S65, by the evaluation value calculation device 31-2, the evaluation value calculation process that is similar to the one in the step S63 is implemented.

Further, in the step S66, in order to obtain sum_j with the watermark pattern of the amount of the shift phase j+r, by the watermark pattern phase shifter 91 and the watermark pattern shifter 71-2, the amount of shift z=j+r is set. Then, in the step S67, by the evaluation value calculation device 31-3, the evaluation value calculation process that is similar to the one in the steps S63, S65 is implemented.

In the step S68, by the evaluation value comparator 33, for example, in accordance with the following equation, from the evaluation values sum_i, sum_j of the amounts of shift i, j, a reference value sum_ave as a standard evaluation value is calculated.

$$sum\_ave = (sum\_i + sum\_j)/2$$

Further, the evaluation value comparator 33 compares, in the step S69, an absolute value of a difference between the evaluation value sum_n of which the evaluation value calculation device 31-1 has obtained in the step S63 and the reference value sum_ave obtained in the step S68, with the threshold th. When the absolute value of the difference is larger than the threshold th, then proceeds to the step S70, and the evaluation value comparator 33 turns on the accompany information signal f. When the absolute value of the difference is equal to or less than the threshold value th, then in the step S71, the evaluation value comparator 33 turns off the accompany information signal f.

Next, in the step S72, it is determined whether or not all shift phases r within the range R are checked, and if there is the shift phase r not having been checked yet, then returns to the step S62 and the processes following therefrom are repeated. That is, at this moment, from the watermark pattern holding memory 32, the next shift phase r and the watermark patter are supplied to the watermark pattern phase shifter 91, and the similar processes are implemented.

When the processes are completed for all shift phases within the range R, proceeds to the step S73, and the watermark specifying device 92 checks the shift phase r as the accompany information signal f being turned on, and from the correspondence table held in the correspondence table holding memory 93, specifies the accompany information signal g to which the shift phase r correspond, and outputs it. Herein, as described before, for each accompany information signal g, a specific meaning is allocated.

Further, at a time when the shift phase r of which the accompany information signal f is turned on appears, a repeating process may be stopped or terminated. Thereafter, by verifying the value of the shift phase with the correspondence table, a kind of accompany information signal g is specified.

The range R[Rmin, Rmax] of the shift phase may be set to any range. For an optional watermark pattern of the length k, normally, a range such as a length of an interval becomes equal to or less than k, such as [0, K−1] and the like is set to be the range R, but any range such that the length of the interval is equal to or greater than k may be taken. Also, by considering the amount of calculation at a time of detecting, any range such that the length of interval is short may be taken.

When detecting the watermark, at a moment of implementing the repetition processes for an inside of the range R of the shift phase, any order and/or phases may be used. For example, the repetition processes may be implemented for all integer position within the range R, or may be implemented for random or arbitrary phases only. Also, the repetition processes may be implemented for the phase of the decimal precision or the shift position, and in these cases, the evaluation value may be obtained by interpolating the watermark pattern and/or the pixel in the subjected area.

A method of reflecting the amount of shift or the shift phase may be anything so long as being identifiable. For example, at a time when reflecting the shift phase r, it is assumed to reduce a certain rotational component rr, and for the amount of shift 0 it is assumed that z=0+r−rr, and then the evaluation value calculation process in FIG. 5 may be implemented.

The correspondence table for specifying a kind of the accompany information signal according to each value of the shift phases may be anything so long as to make a correspondence.

Figure 13:
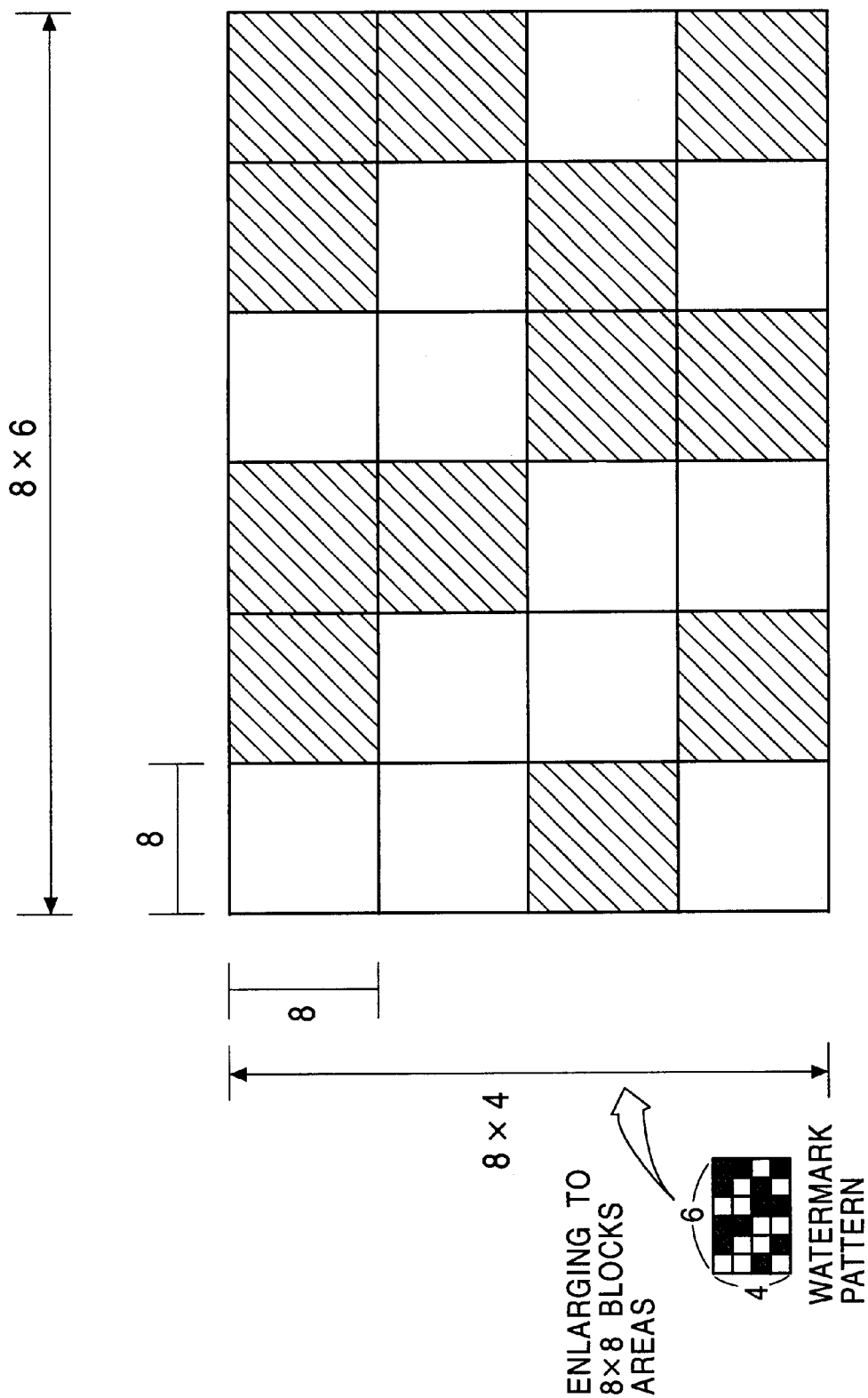
FIG. 13 is a diagram illustrating a blocking of the pattern of the watermark.
Figure 14:
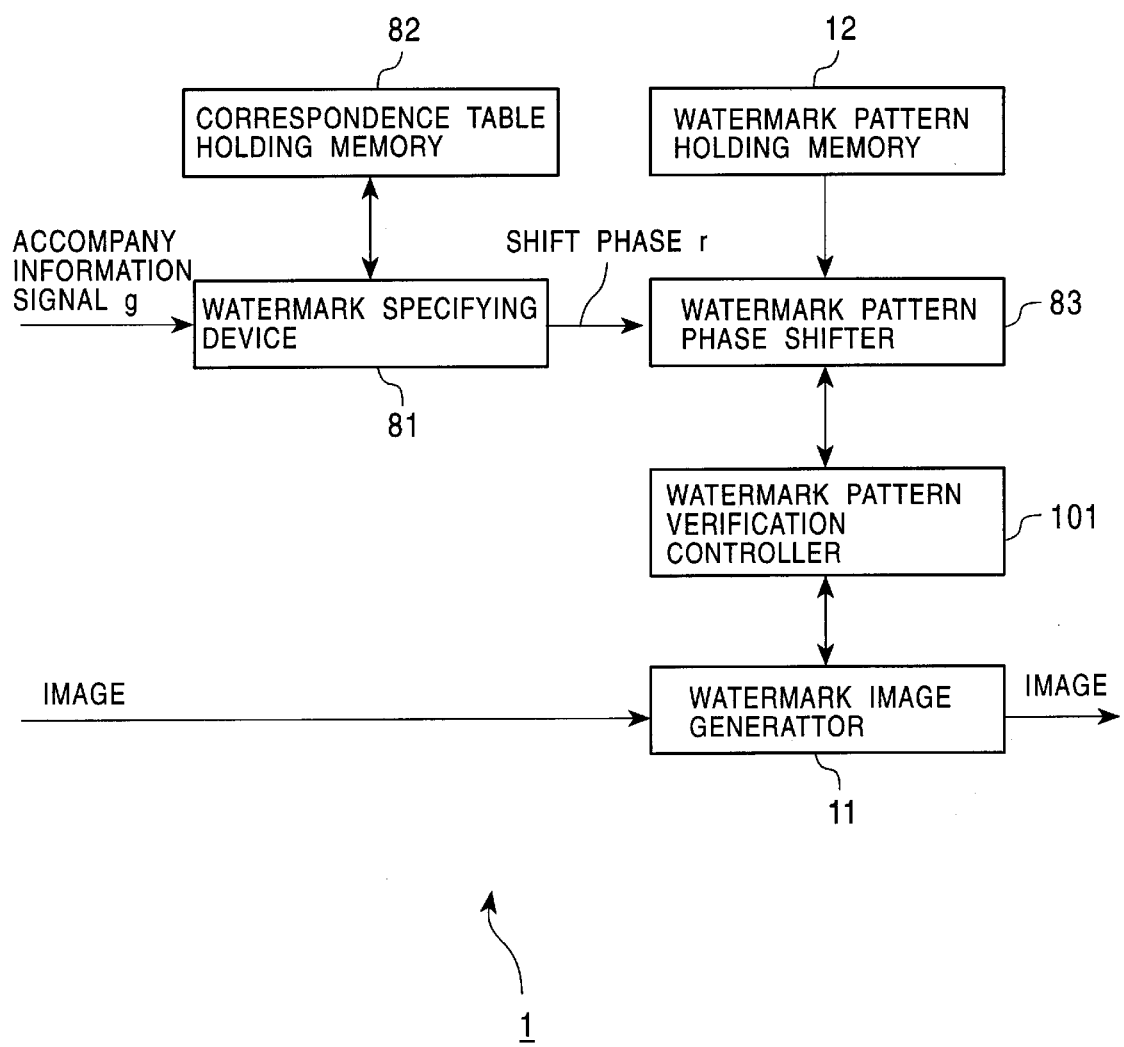
FIG. 14 is a block diagram showing another configuration example of the watermark adding device 1 in FIG. 1.

In the above description, the watermark is configured with one pixel unit, for example, as shown in FIG. 13, it may be configured by blocking with 8×8 pixel units. In this case, the watermark adding device 1 is configured, for example, as shown in FIG. 14. Herein, the watermark adding device 1 in FIG. 14 corresponds to the watermark adding device 1 shown in FIG. 8. In this configuration, for example, as shown in FIG. 13, when the watermark pattern verification controller 101 is configured with the pattern corresponding to 4×6 pixels, read from the watermark pattern holding memory 12, one pixel portion is enlarged to a block for 8×8 pixels and is supplied to the watermark image generator 11.

Figure 15:
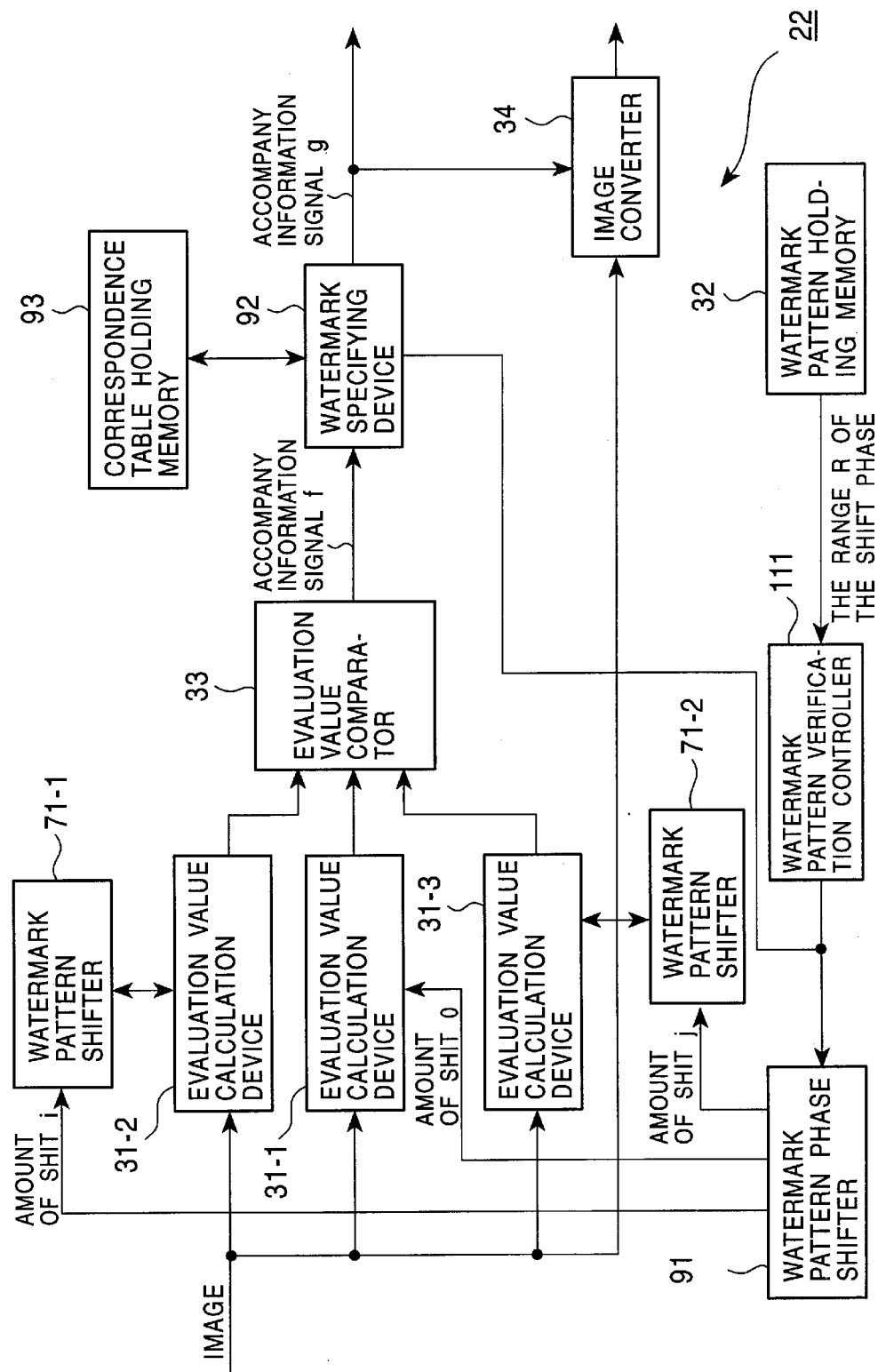
FIG. 15 is a block diagram showing another configuration example of the watermark detector 22 in FIG. 2.

Further, the watermark detector 22 shown in FIG. 11 is configured, for example, as shown in FIG. 15. In this configuration, the watermark pattern outputted from the watermark pattern holding memory 32 is enlarged by the watermark pattern evaluation controller 111 with a block unit, and is supplied to the watermark pattern phase shifter 91. Other configurations and the operations are the same as the ones in FIG. 10.

Figure 16:
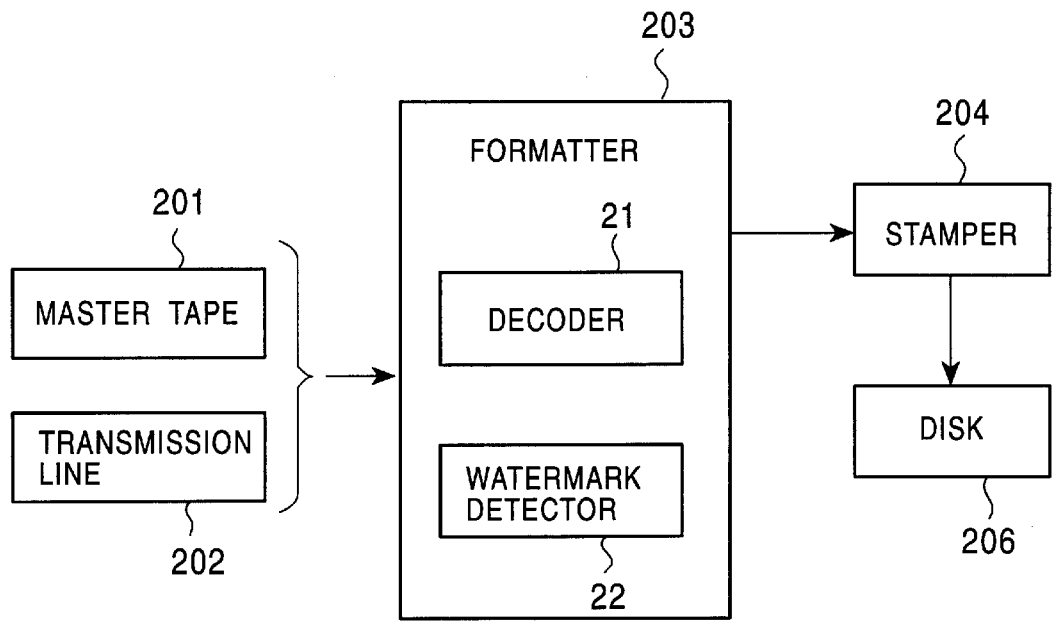
FIG. 16 is a diagram showing a configuration example of the formatter for which the present invention is applied.

In the above description, the examples of which the present invention is applied for the encoder and the decoder are described, but for example, as shown in FIG. 16, it is also applicable for the formatter. In this case, the image data supplied from a master tape 201 or a transmission line 202 is supplied to the formatter 203. The formatter 203 includes a decoder 21 with a configuration as described above and a watermark detector 22. The decoder 21 decodes the sign bit train inputted, and outputs it to the watermark detector 22. When the image data from the master tape 201 or the transmission line 202 is the image data in the already-decoded state, then this one is directly supplied to the watermark detector 22.

The watermark detector 22 detects whether or not the image data inputted includes the watermark, and in accordance with the detection result thereof, controls the image converter 34. Accordingly, the image data to which the watermark is added is outputted, and the stamper 204 is formed, and from this stamper 204, a great numbers of replica disk 205 are generated. On the contrary, when the image data inputted is the one to which the watermark is not added, the image converter 34 does not output the image data. Accordingly, in this case, the stamper 204 can be produced.

Figure 17:
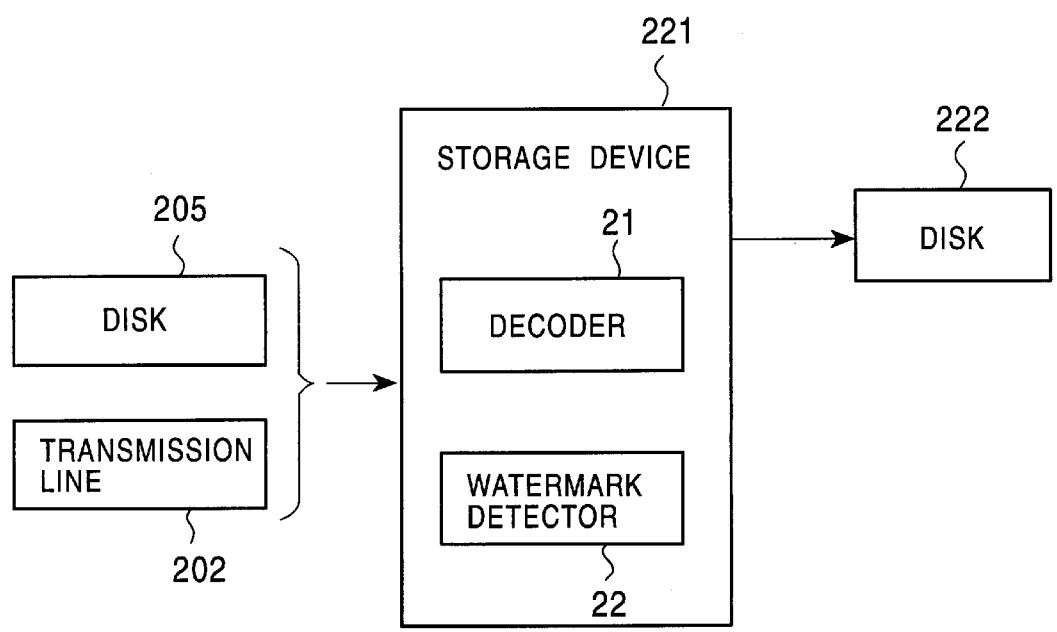
FIG. 17 is a diagram showing a configuration example of the recording apparatus for which the present invention is applied.
Figure 18:
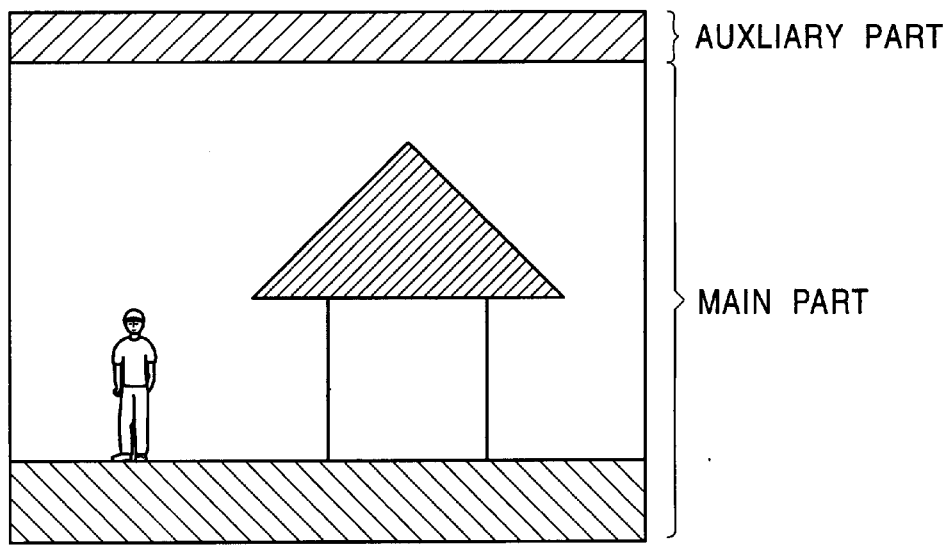
FIG. 18 is a diagram illustrating a conventional method of recording an accompany information.
Figure 19:
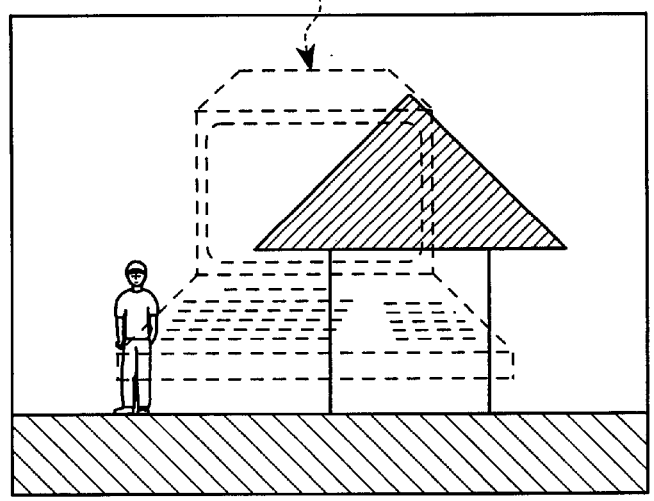
FIG. 19 is a diagram illustrating an embedding of an accompany information by a watermark.

FIG. 17 shows a configuration example when the present invention is applied for the recording apparatus. In this case, in the recording apparatus 221, for example, the encoded image data from the disk 205 which is produced by the formatter 203 in FIG. 16, or from the transmission line 202, or the already-decoded image data is inputted. The encoded image data is, after having decoded by the decoder 21, supplied to the watermark detector 22. The already decoded image data is directly supplied to the watermark detector 22.

The watermark detector 22 outputs the image data from the image converter 34, and records it to the disk 222 when the watermark is added, the same as in the formatter 203 in FIG. 16, but when the watermark is not added, controls the image converter 34, and do not output the image data. As a result, at this moment, the image data inputted to the recording apparatus 221 can not be recorded in the disk 222.

Herein, as a transmission medium for transmitting to a user a program which implements the above-mentioned processes, the communication media such as a network, a satellite and the like can be utilized besides the recording media such as a magnetic disk, a CD-ROM, a solid-memory and the like.

Further, within the range of not departing from the gist of the present invention, various modifications and the applications could be considered. Accordingly, the main point of the present invention is not limited to the above described embodiments.

Described as above, according to an apparatus and a method of processing an image data, and a recording media thereof, described in the present invention, a first evaluation value corresponding to a pattern of a watermark of a first phase, and a value corresponding to a second evaluation value corresponding to a pattern of a watermark of a second phase are compared, as a result, it makes possible to detect a watermark much accurately and reliably.

Also, a phase of the watermark is set corresponding to a predetermined one among a plurality of accompany information signal, thus, for example, not only a simple copy prevention, but also it make possible to provide the recording media with various correspondence, such as one time copy available, two time copy available, and the like.

What is claimed is:

1. An image data processing apparatus for processing an image data in which an accompany information is embedded as a watermark, comprising:

a first storage means for storing a pattern of said watermark;

a second storage means for storing a relationship of a plurality of accompany information signals indicating respective copy protection states and a phase of said watermark, said phase of said watermark corresponding to a spatial position of said watermark;

a selecting means for selecting a phase of said watermark corresponding to said accompany information signal;

a phase setting means for reading a pattern of said watermark being stored in said first storage means, and for setting to a phase selected by said selecting means by spatially shifting said watermark stored in said first storage means; and an adding means for adding a watermark of said phase set by said phase setting means to said image data.

2. An image data processing apparatus according to claim 1, wherein different meanings are allocated to said plurality of accompany information signals, respectively.

3. An image data processing apparatus according to claim 2, wherein different meanings are allocated to said plurality of accompany information signals, respectively.

4. An image data processing method for embedding an accompany information as a watermark in an image data, comprising the steps of:

storing a pattern of said watermark in a first memory;

storing a relationship of a plurality of accompany information signals indicating respective copy protection states and a phase of said watermark in a second memory, said phase of said watermark corresponding to a spatial position of said watermark;

selecting a phase of said watermark corresponding to said accompany information signal;

reading a pattern of said watermark being stored in said first memory, and setting to a phase selected by said selecting step by spatially shifting said watermark stored in said first memory; and adding a watermark of said phrase set by said phase setting step to said image data.

5. A transmission method for transmitting image data used in an image data processing apparatus, said image data having accompany information embedded as a watermark, the method comprising the steps of:

storing a pattern of said watermark;

storing a relationship of a plurality of accompany information signals indicating respective copy protection states and a phase of said watermark, said phase of said watermark corresponding to a spatial position of said watermark;

selecting a phase of said watermark corresponding to said accompany information signal;

reading a pattern of said watermark stored in said first storing step, and setting to a phase selected by; said selecting step by spatially shifting said watermark stored in said first storing step; and adding a watermark of said phase set by said phase setting operation to said image data.

6. An image data processing method for processing an image data in which an accompany information is embedded as a watermark, comprising the steps of:

storing a pattern of said watermark in a first memory;

storing a relationship of a plurality of accompany information signals indicating respective copy protection states and a phase of said watermark, said phase of said watermark corresponding to a spatial position of said watermark;

setting a phase of a pattern of said watermark being stored in said first memory to a first phase or a second phase by spatially shifting said watermark;

calculating a first evaluation value corresponding to a pattern of said watermark of said first phase, and a second evaluation value corresponding to a pattern of said watermark of said second phase;

comparing said first evaluation value and a value corresponding to said second evaluation value; and selecting an accompany information signal form said second memory in accordance with a result of said comparing step.

7. An image data processing method according to claim 6, wherein different meanings are allocated to said plurality of accompany information signals, respectively.

8. An image data processing method according to claim 6, wherein said phase setting step sets a phase of a pattern of said watermark being stored in said first memory, from a first to a third phases;

said calculating step calculates a first to a third evaluation values corresponding to said first to said third phases, and obtains an evaluation value to be a reference, from said first to said third evaluation values, and sets said evaluation value to be said reference as a value corresponding to said second evaluation value.

9. An image data processing method according to claim 6, wherein said phase setting step sets a phase of said watermark within a predetermined range.

10. An image data processing method according to claim 6, further comprising control step for controlling an output of said image data, in correspondence with a result of said accompany information signal.

11. A transmission method for transmitting image data used in an image data processing apparatus, said image data having accompany information embedded as a watermark, the method comprising the steps of:

storing a pattern of said watermark in a first memory;

storing a relationship of a plurality of accompany information signals indicating respective copy protection states and a phase of said watermark in second memory, said phase of said watermark corresponding to a spatial position of said watermark;

setting a phase of a pattern of said watermark being stored in said first memory to a first phase or a second phase by spatially shifting said watermark;

calculating a first evaluation value corresponding to a pattern of said watermark of said first phase, and a second evaluation value corresponding to a pattern of said watermark of said second phase;

comparing said first evaluation value and a value corresponding to said second evaluation value; and selecting an accompany information signal from said second memory in accordance with a result of said comparing step.

12. A recording medium on which image data is stored, said image data including an accompany information which is embedded as a watermark, a phase of said watermark being set in correspondence with a predetermined one of a plurality of accompany information by spatially shifting said watermark;

whereby a device for recording and/or reading said medium includes a memory for storing a relationship of a plurality of accompany information signals indicating respective copy protection states and a phase of said watermark, and said recording medium is configured to interact with said device such that said device can determine said one of said plurality of accompany information by using said memory.

* * * * *